US009348197B2

(12) United States Patent
Lewis

(10) Patent No.: US 9,348,197 B2
(45) Date of Patent: May 24, 2016

(54) PLATFORM STABILIZATION SYSTEM

(71) Applicant: PV Labs Inc., Hamilton (CA)

(72) Inventor: Michael D. Lewis, Burlington (CA)

(73) Assignee: PV Labs Inc., Ontario (CA)

( * ) Notice: Subject to any disclaimer, the term of this patent is extended or adjusted under 35 U.S.C. 154(b) by 118 days.

(21) Appl. No.: 14/140,130

(22) Filed: Dec. 24, 2013

(65) Prior Publication Data

US 2015/0176752 A1    Jun. 25, 2015

(51) Int. Cl.
| | |
|---|---|
| *F16M 13/00* | (2006.01) |
| *G03B 17/56* | (2006.01) |
| *B64D 47/08* | (2006.01) |
| *F16F 15/00* | (2006.01) |
| *F16M 11/10* | (2006.01) |
| *F16M 11/12* | (2006.01) |
| *F16M 11/18* | (2006.01) |
| *F16M 11/20* | (2006.01) |
| *H04N 5/232* | (2006.01) |

(52) U.S. Cl.
CPC .............. *G03B 17/561* (2013.01); *B64D 47/08* (2013.01); *F16F 15/00* (2013.01); *F16M 11/10* (2013.01); *F16M 11/12* (2013.01); *F16M 11/18* (2013.01); *F16M 11/2014* (2013.01); *H04N 5/2328* (2013.01); *H04N 5/23258* (2013.01)

(58) Field of Classification Search
USPC ......... 248/603, 605, 618, 619, 620, 621, 637, 248/638, 349.1
See application file for complete search history.

(56) References Cited

U.S. PATENT DOCUMENTS

| | | | |
|---|---|---|---|
| 2,490,628 | A | 12/1949 | Isserstedt |
| 2,506,095 | A | 5/1950 | Mantz |
| 2,523,267 | A | 9/1950 | Aschenbrenner et al. |
| 2,551,069 | A | 5/1951 | Strother |
| 2,883,863 | A | 4/1959 | Karsten et al. |
| 3,060,824 | A | 10/1962 | Brenner et al. |
| 3,490,728 | A | 1/1970 | Stenstroem |
| 3,606,233 | A | 9/1971 | Scharton et al. |
| 3,638,502 | A | 2/1972 | Leavitt et al. |
| 3,775,656 | A | 11/1973 | Romans |
| 3,986,092 | A | 10/1976 | Tijsma et al. |
| 4,017,168 | A | 4/1977 | Brown |
| 4,033,541 | A | 7/1977 | Malueg |

(Continued)

FOREIGN PATENT DOCUMENTS

| | | |
|---|---|---|
| WO | WO-2012/069487 | 5/2012 |
| WO | WO-2012/170673 | 12/2012 |
| WO | WO-2013/039401 | 3/2013 |

*Primary Examiner* — Steven Marsh
(74) *Attorney, Agent, or Firm* — Jordan and Hamburg LLP

(57) ABSTRACT

A platform stabilization system comprises a support frame, a platform and a plurality of isolators each extending directly between the support frame and the platform. Each isolator permits linear movement of the platform relative to the support frame with three degrees of freedom and permits rotational movement of the platform relative to the support frame with three degrees of freedom. The isolators cooperate to form an isolation array supporting the platform directly within, and spacing the platform from, the support frame. The isolation array permits limited linear movement of the platform within the support frame with three degrees of freedom and permits limited rotational movement of the platform relative to the support frame with three degrees of freedom. The isolation array is substantially more resistant to linear movement of the platform than to rotational movement of the platform and does not rotationally constrain the platform.

40 Claims, 19 Drawing Sheets

(56) References Cited

U.S. PATENT DOCUMENTS

| | | | | |
|---|---|---|---|---|
| 4,156,512 | A | 5/1979 | Brown | |
| 4,482,125 | A * | 11/1984 | Ziernicki | F21L 14/04 248/604 |
| 4,498,038 | A | 2/1985 | Malueg | |
| 4,531,699 | A | 7/1985 | Pinson | |
| 4,733,839 | A | 3/1988 | Gehris | |
| 4,796,090 | A | 1/1989 | Fraier | |
| 4,821,043 | A | 4/1989 | Leavitt | |
| 4,828,376 | A | 5/1989 | Padera | |
| 4,989,466 | A | 2/1991 | Goodman | |
| 5,053,687 | A * | 10/1991 | Merlet | F16H 21/46 318/566 |
| 5,184,521 | A | 2/1993 | Tyler | |
| 5,243,370 | A | 9/1993 | Slater | |
| 5,368,271 | A | 11/1994 | Kiunke et al. | |
| 5,435,515 | A | 7/1995 | DiGiulio et al. | |
| 5,868,031 | A | 2/1999 | Kokush et al. | |
| 5,897,223 | A | 4/1999 | Tritchew et al. | |
| 5,995,758 | A | 11/1999 | Tyler | |
| 6,145,393 | A | 11/2000 | Canton | |
| 6,196,514 | B1 | 3/2001 | Kienholz | |
| 6,198,452 | B1 | 3/2001 | Beheler et al. | |
| 6,263,160 | B1 | 7/2001 | Lewis | |
| 6,330,837 | B1 * | 12/2001 | Charles | A61B 19/22 74/490.06 |
| 6,396,235 | B1 | 5/2002 | Ellington et al. | |
| 6,454,229 | B1 | 9/2002 | Voigt et al. | |
| 6,484,978 | B2 | 11/2002 | Voigt et al. | |
| 6,609,037 | B1 | 8/2003 | Bless et al. | |
| 6,720,994 | B1 | 4/2004 | Grottodden et al. | |
| 6,849,980 | B1 | 2/2005 | Voigt et al. | |
| 7,000,883 | B2 | 2/2006 | Mercadal et al. | |
| 7,320,389 | B1 | 1/2008 | Myers et al. | |
| 7,876,359 | B2 | 1/2011 | von Flotow et al. | |
| 8,100,591 | B2 | 1/2012 | Chapman et al. | |
| 8,385,065 | B2 | 2/2013 | Weaver et al. | |
| 8,564,499 | B2 | 10/2013 | Bateman et al. | |
| 2008/0158371 | A1 | 7/2008 | Trescott | |
| 2010/0171377 | A1 | 7/2010 | Aicher et al. | |
| 2010/0234844 | A1 * | 9/2010 | Edelhauser | A61B 17/62 606/56 |
| 2011/0205703 | A1 | 8/2011 | Weaver et al. | |
| 2011/0280565 | A1 | 11/2011 | Chapman et al. | |
| 2012/0019660 | A1 | 1/2012 | Golan et al. | |
| 2013/0142608 | A1 * | 6/2013 | Zhang | B25J 9/0051 414/729 |

* cited by examiner

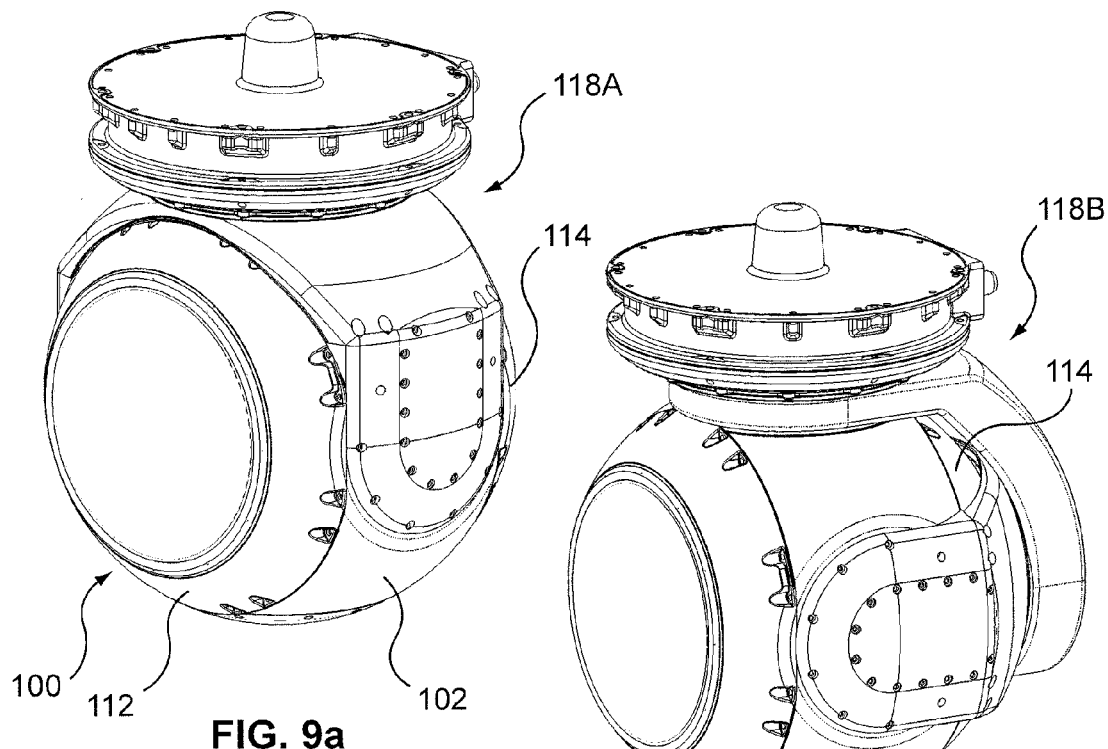
FIG. 9a
FIG. 9b
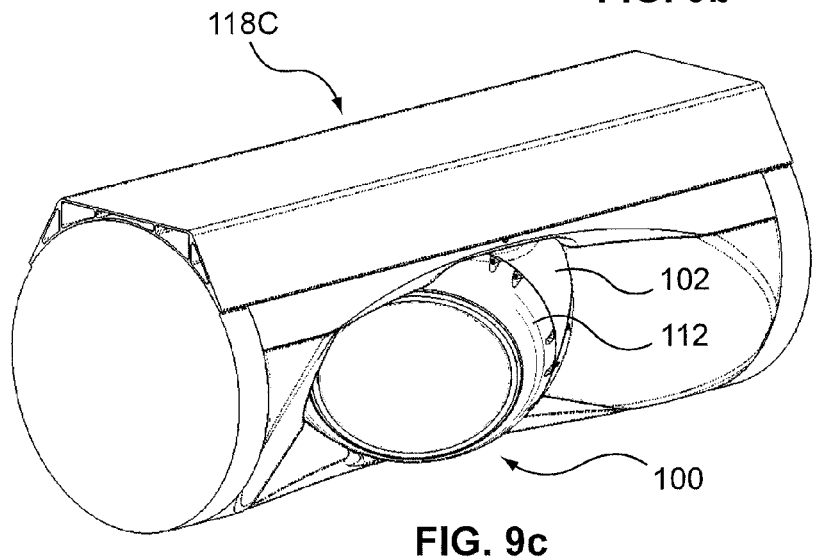
FIG. 9c

PLATFORM STABILIZATION SYSTEM

TECHNICAL FIELD

The present disclosure relates to platform stabilization systems, and more particularly to platform stabilization systems for isolating a payload from angular motions and translational and angular vibrations of a supporting structure.

BACKGROUND

Stabilized platform systems have been around for many years, and are used to isolate a payload carried by the platform from the movement of the structure that carries the platform. The structure may be a vehicle like an airplane, helicopter or automobile, or a relatively static structure which is still subject to some movement, such as a tall pole that may sway in the wind. There is virtually no limit to what may be carried as the payload of a stabilized platform system, and stabilized platform systems may be used in a variety of applications for payloads including, but not limited to, still photographic and video (including cinema) cameras, electro-optical and infrared imaging devices, spectrometers, antennae, lasers, and even weapon systems. What distinguishes this category of stabilization technology from others is that the platform that carries the payload is being stabilized and steered in inertial space. U.S. Pat. No. 4,796,090 to Fraier provides a detailed description of the need for platform stabilization in long range, high resolution, surveillance systems combined with the benefit of reduced integration times.

Various technologies for compensating for the movement of the structure carrying a sensor payload are known, each with drawbacks and limitations.

One approach for image-capturing payloads such as camera systems is to try to digitally stabilize the image captured by the payload, rather than stabilizing the payload itself. U.S. Patent Application Publication No. 20120019660A1 in the name of Golan describes the use of sequential image analysis, digital windowing and pixel shifting techniques as a means of digitally stabilizing the image and then further computing camera maneuvering signals to steer a coarse pan/tilt gimbal system. U.S. Pat. No. 7,876,359 to VonFlotow describes a similar digital stabilization technique, and U.S. Pat. No. 6,720,994 to Grottodden et al. describes a technique for adjusting the sample time between individual lines of pixels on the detector array as the image is captured. The issue with these digital stabilization techniques is that nothing is done to compensate for the motion of the payload's line of sight during the integration time period of the pixels that make up the image. This may result in motion-based blur in the captured image.

Other approaches seek to actually stabilize the payload relative to the supporting structure by stabilizing the platform that carries the payload. Within this "platform stabilization system" category there are passive and active systems. One example of a passive stabilization system is the STEADI-CAM® system described in U.S. Pat. Nos. 4,017,168 and 4,156,512 to Brown and U.S. Pat. No. 5,435,515 to DiGiulio et al. Another passive system is described in U.S. Pat. No. 5,243,370 to Slater. However, most platform stabilization systems make use of servomotors, inertial sensors, and a control system to augment the inherent inertia of the platform and are thus termed active systems.

Platform stabilization systems were initially developed to mount navigation instruments on moving vehicles such as ships and aircraft. Gyro compasses and vertical gyros, such as taught by U.S. Pat. No. 2,551,069 to Strother et al., are early examples of platform stabilization systems. Eventually, photographic cameras were mounted on these stable platforms to remove the unwanted motion of the vehicles during the acquisition of the image, for example as taught by U.S. Pat. No. 2,490,628 to Issertedt, U.S. Pat. No. 2,523,267 to Aschenbrenner et al., U.S. Pat. No. 2,883,863 to Karsten et al., U.S. Pat. No. 3,060,824 to Brenner et al. and U.S. Pat. No. 3,775,656 to Romans. Motion picture cameras, however, required more than just stability during the image acquisition; they also needed smooth steering control between the images.

New isolation mounts, such as those taught by U.S. Pat. No. 2,506,095 to Mantz, were developed to allow the camera to be manually steered while attenuating some of the vehicle vibration. Fixed gyros were added to the cameras to further improve stability and smoothness of steering. The camera operator typically sat in the open doorway of a helicopter with the camera, attached to an isolation mount with fixed gyros adding stability, placed over one shoulder. The camera operator would carefully coordinate with the pilot to steer the camera. This obviously made it quite difficult to frame the subject of the movie shot and achieve visually pleasing camera control.

In the late 1960s, Westinghouse Canada developed the WESCAM® platform stabilization system to address these issues. This was the first commercially available gyro stabilized, remotely steered camera system and is the subject of U.S. Pat. No. 3,638,502 to Leavitt et al. This type of stabilization technology relies on the angular momentum generated in three orthogonal, large mechanical rate gyroscopes (gimbaled flywheels) to augment the natural inertia of the camera platform. This artificial mass or synthetic inertia is used passively to maintain a slightly pendulous stable platform, with the payload (a camera) being steered relative to that stabilized platform. An active servo system then uses the angular rates measured by the precession of the gyros to cancel any disturbances using servomotors. A dome enclosure keeps the wind and weather out and an internal passive vibration isolation system minimizes the vibration input to the system.

The prior art for active platform stabilization technology can be classified into four general types or "generations": gyro stabilized systems (first generation), classical active gimbal systems (second generation), limited travel—active follow-up systems (third generation) and unconstrained actuator—active follow-up systems (fourth generation). Within each generation there may be subtle differences in the implementation methods and advantages, however, the basic techniques are the same. The original WESCAM® platform stabilization system technology described in U.S. Pat. No. 3,638,502 is classified as first generation platform stabilization technology. It was further refined and a vertically slaved window was added, as described in U.S. Pat. No. 4,821,043 to Leavitt, to improve the optical performance of the system. Other first generation platform stabilization systems are described in U.S. Pat. No. 4,989,466 to Goodman and U.S. Pat. Nos. 5,184,521 and 5,995,758 to Tyler. While the first generation platform stabilization systems achieved significant stability, they suffered from poor steering bandwidth, which made them incompatible with video-trackers and required a highly skilled operator to compensate for this poor steering performance.

A second generation of active platform stabilization technology was developed to address the poor steering performance of the early first generation platform stabilization systems. These second generation platform stabilization systems, referred to as "classical active gimbal systems", interpose a plurality of gimbals between the structure and the platform and close rate loops directly about each gimbal axis.

Inertial rate sensors, such as small mechanical sensing gyros, are used to sense angular rates of the platform relative to inertial space. These rates are summed with the steering commands to stabilize and steer each axis. U.S. Pat. No. 3,986,092 to Tijsma et al., U.S. Pat. No. 5,868,031 to Kokush et al., U.S. Pat. No. 6,396,235 to Ellington et al., U.S. Pat. No. 7,000,883 to Mercadal et al., U.S. Pat. No. 8,100,591 to Chapman et al. and U.S. Pat. No. 8,564,499 to Bateman et al. are all examples of classical active gimbal systems. While each patent document describes subtly different methods and advantages, they all use a system of gimbals to support a platform, while closing rate loops directly about each gimbal axis using inertial rate sensors. The actuator can be either a direct-drive or a geared motor. The use of a geared actuator will increase coupling forces substantially, introduce backlash, and limit the steering bandwidth of the system. The structure between each successive gimbal axis is subjected to the high frequency torques of the actuators. Compliance in this constraint structure will limit the bandwidth of the control system. For this reason, classical active gimbal systems are generally incapable of high bandwidth performance with large payloads. U.S. Pat. No. 6,198,452 to Beheler presents an alternate, non-orthogonal, gimbal geometry for a classical active gimbal system, and U.S. Pat. No. 6,609,037 to Bless et al. describes a control system for a classical gimbal system that uses rate feedback and feed-forward control loops combined with position feedback and feed-forward control loops for each axis to further improve the steering performance. The classical active gimbal system was improved by the addition of an independent outer gimbal in the form of a dome enclosure with a vertically slaved window as described in U.S. Pat. No. 4,821,043 noted above and a passive isolator interposed between the dome and the inner platform stabilization system. The friction from the large gimbal bearings and motor brushes, combined with the structural resonances of the gimbal constraint system, limited the achievable stabilization performance of this system.

In order to further improve platform stability over that achieved by classical active gimbal systems, a third generation of active platform stabilization system was developed. It uses a higher bandwidth, limited travel inner gimbal mounted on a passive isolator, which in turn is mounted on the final stage of a low bandwidth, large travel outer follow-up gimbal system. As such, this type of platform stabilization system is referred to as a "limited travel—active follow-up" system. The inner gimbal provides the high bandwidth stabilization and fine steering performance, while the outer gimbal provides the coarse steering over a large field of regard. The inner gimbal uses high performance, direct drive actuators and the outer gimbal uses geared actuators. The high frequency torques are, however, still applied through the inner gimbals' constraining structure, but the inner gimbals' bearings are much smaller and the motors are typically brushless. While with smaller payloads, and with the use of fibre-optic gyros, the stabilization performance of this type of inner/outer gimbal system is satisfactory, with large payloads the compliance of the large gimbal ring structure limits the bandwidth of the stabilization system. U.S. Patent Application Publication No. 2010/0171377A1 in the name of Aicher et al. and U.S. Pat. No. 8,385,065 to Weaver et al. are recent examples of "limited travel—active follow-up" platform stabilization systems.

To address the bandwidth limitations caused by the structural resonances of the constraint system in the "limited travel—active follow-up" platform stabilization system, a fourth generation of active platform stabilization system was developed. This type of system, referred to herein as an "unconstrained actuator—active follow-up" system, avoids the bandwidth limitation of the "limited travel—active follow-up" system by using a process of torquing across the constraining structure instead of through it. The high frequency torques are applied directly from the outer gimbal to the platform. Combined with a high performance fibre-optic-gyro-based inertial measurement unit, this system raised the steering bandwidth significantly while maintaining stability. Examples of "limited travel—active follow-up" platform stabilization systems are described in U.S. Pat. Nos. 4,033,541 and 4,498,038 to Malueg, U.S. Pat. No. 4,828,376 to Padera, U.S. Pat. No. 5,368,271 to Kiunke et al., U.S. Pat. No. 5,897,223 to Tritchew et al., U.S. Pat. No. 6,196,514 to Kienholz, U.S. Pat. No. 6,263,160 to Lewis, U.S. Pat. Nos. 6,454,229 and 6,484,978 to Voigt et al. and U.S. Pat. No. 6,849,980 to Voigt et al. While each patent describes subtly different methods and advantages, they all:

use a system of intervening gimbals to support a platform on a support frame, while the gimbals constrain the platform's motion to limited rotation in three axes;

use an array of voice coil actuators which are configured to apply torques across, rather than through, the gimbal constraint system (sometimes across the gimbal and the isolator array in series); and use an array of angular, inertial sensors to drive the voice coil motors to stabilize and steer the platform and thereby control the payload's line of sight.

An alternate, non-orthogonal, inner gimbal configuration is presented in U.S. Pat. No. 4,733,839 to Gehris. The limited space available between the shells around the pivots suggests its intended use as either a "free gimbal", missile seeker head, or unconstrained actuator—active follow-up platform stabilization system.

The primary problems with the current state of the art in active platform stabilization technology are cost, complexity, and reliability. The complex mechanical gimbal systems of the existing technologies are dominated by recurring costs. These include tight machining tolerances for bearing interfaces, the need for complex inspection and testing, precise alignment and preload of gimbal bearings during assembly, and ongoing inspection and maintenance.

SUMMARY

The present disclosure describes platform isolation systems in which an isolation array supports the platform directly within the support frame, without the use of intervening gimbals, rings or other rotational constraints, to provide linear isolation while permitting the platform to rotate relative to the support frame.

A platform stabilization system for isolating a payload from motion of a supporting structure comprises a support frame, a platform for carrying a payload, and a plurality of isolators each extending directly between the support frame and the platform. Each isolator permits linear movement of the platform relative to the support frame with three degrees of freedom and each isolator permits rotational movement of the platform relative to the support frame with three degrees of freedom. The isolators cooperate to form an isolation array supporting the platform directly within the support frame and the isolation array spaces the platform from the support frame. The isolation array permits limited linear movement of the platform relative to the support frame with three degrees of freedom along three orthogonal platform axes and the isolation array permits limited rotational movement of the platform relative to the support frame with three degrees of freedom about the three platform axes. The isolation array is substantially more resistant to linear movement of the platform relative to the support frame than to rotational movement of the platform relative to the support frame, and the platform is not rotationally constrained by the isolation array.

Preferably, the isolation array has an undamped natural frequency for linear movement of the platform along the platform axes that is at least two times the undamped natural frequency for rotational movement of the platform about the platform axes. More preferably, the undamped natural frequency for linear movement of the platform along the platform axes is at least three times the undamped natural frequency for rotational movement of the platform about the platform axes. Still more preferably the undamped natural frequency for linear movement of the platform along the platform axes is at least five times the undamped natural frequency for rotational movement of the platform about the platform axes, and even more preferably the undamped natural frequency for linear movement of the platform along the platform axes is at least ten times the undamped natural frequency for rotational movement of the platform about the platform axes.

In one embodiment, each isolator comprises at least one compression spring having a respective spring axis, and to form the isolation array, the compression springs are arranged with their respective spring axes radiating outward substantially from a common point within the platform, with the common point being the centroid of mass of the platform, and the compression springs are axially preloaded to produce a low lateral spring rate. In one particular embodiment, the isolation array comprises eight compression springs arranged substantially at corners of a notional cube and the common point is a centroid of the notional cube. In another particular embodiment, the isolation array comprises at least one array of four compression springs arranged substantially at corners of a notional regular tetrahedron and the common point is a centroid of the notional regular tetrahedron. In yet another particular embodiment, the isolation array comprises six compression springs radiating outward from a centroid of a notional cube substantially through centroids of the six faces of the notional cube.

In certain embodiments, the isolation array comprises a symmetrical array of compression springs.

Where compression springs are used for isolators, the compression springs are preferably machined, multi-start, helical compression springs.

In another embodiment, each isolator comprises a flexural pivot element. Each flexural pivot element may comprise three single-axis flexural pivots arranged in series with each flexural pivot having a pivot axis. For each flexural pivot element, the pivot axes of each flexural pivot substantially meet at a centroid of mass of the platform and the flexural pivot elements are arranged in a substantially symmetrical array to form the isolation array. Preferably, each flexural pivot element is of monolithic construction.

In a further embodiment, each isolator is a diaphragm-based isolator. Each diaphragm-based isolator may comprise two opposed diaphragms, a first housing carried by the support frame, a second housing carried by the platform, with each housing having a diaphragm receptacle defined therein and the diaphragm receptacles being opposed to one another. Each diaphragm is supported at its periphery by one of the housings and extends across the diaphragm receptacle of that housing so that for each isolator, one of the diaphragms is coupled to the support frame and the other diaphragm is coupled to the platform. The diaphragms are coupled to one another by a torsional flexure element extending between radial centers of the diaphragms. The torsional flexure element is preferably axially resilient, and may be a helical spring. The diaphragms may be, for example, molded elastomeric structures or metal bellophragm structures. Each diaphragm-based isolator may further comprise a stop carried by the torsional flexure element to limit lateral travel of the torsional flexure element.

In one particular embodiment, each diaphragm is fluid-impermeable and each housing cooperates with its respective diaphragm to form a damping reservoir, with each damping reservoir being in fluid communication with a respective sink reservoir for damping axial movement of the respective diaphragm by displacing damping fluid from the respective damping reservoir to the respective sink reservoir. In a particular implementation of this embodiment, each housing cooperates with its respective diaphragm to form an enclosure and a divider extends across each enclosure to divide the respective enclosure into the damping reservoir and the sink reservoir, with each damping reservoir being in fluid communication with the respective sink reservoir through at least one orifice in the respective divider.

The platform stabilization system preferably further comprises an active drive system acting directly between the support frame and the platform and a control system coupled to the active drive system for receiving sensor input and controlling the active drive system in response to the sensor input. The control system may use the sensor input to control the active drive system for stable motion of the platform and/or to control the active drive system for active damping of the platform.

In one embodiment, the active drive system comprises an array of at least three magnetic voice coil actuators. Each magnetic voice coil actuator comprises a first portion carried by the support frame and a second portion carried by the platform. Each magnetic voice coil actuator acts directly between the support frame and the platform to apply a first platform positioning force to the platform along a first motor axis and apply a second platform positioning force to the platform along a second motor axis while permitting free linear movement of the platform along a third motor axis and permitting free rotation of the platform about the three motor axes, with the first, second and third motor axes being substantially orthogonal to one another. The magnetic voice coil actuators are arranged relative to the platform for selectively driving linear movement of the platform relative to the support frame along the platform axes and for selectively driving rotation of the platform relative to the support frame about the platform axes, and the control system controls energization of the voice coil actuators to apply controlled moments and linear forces to the platform. In one particular embodiment, the active drive system comprises four magnetic voice coil actuators arranged approximately 90 degrees apart on the circumference of a notional circle.

In another embodiment, the active drive system comprises an array of at least six magnetic voice coil actuators. Each magnetic voice coil actuator comprises a first portion carried by the support frame and a second portion carried by the platform. Each magnetic voice coil actuator acts directly between the support frame and the platform to apply a first platform positioning force to the platform along a first motor axis while permitting free linear movement of the second portion along each of a second motor axis and a third motor axis and permitting free rotation of the second portion about each of the second motor axis and the third motor axis, with the first, second and third axes being substantially orthogonal to one another. The magnetic voice coil actuators are arranged relative to the platform for selectively driving linear movement of the platform relative to the support frame along the platform axes and for selectively driving rotation of the platform relative to the support frame about the platform axes, and the control system controls energization of the voice coil actuators to apply controlled moments and linear forces to the platform.

The platform stabilization system may further comprise an angle sensor system for sensing and providing a signal indicative of an angular position of the platform relative to the support frame about the platform axes, with the angle sensor system being coupled to the control system.

The platform stabilization system may further comprise a linear position sensor system for sensing and providing a signal indicative of a linear position of the platform relative to the support frame on the platform axes, with the linear position sensor system being coupled to the control system.

In an embodiment, the platform carries at least three inertial rate sensors for sensing and providing a signal indicative of angular movement of the platform about the platform axes, with the inertial rate sensors being coupled to the control system. The inertial rate sensors may be fibre-optic gyros.

In an embodiment, the platform carries at least three inertial acceleration sensors for sensing and providing a signal indicative of linear movement of the platform along the platform axes, with the inertial acceleration sensors being coupled to the control system.

The platform stabilization system may further comprise an inertial measurement unit for sensing and providing signals indicative of linear and angular movement of the platform about the platform axes, with the inertial measurement unit being coupled to the control system.

The platform stabilization system may further comprise a GPS receiver coupled to the control system, and the control system may contain instructions for an inertial navigation system for computing the geographic position where a platform line of sight intersects the earth's surface. The control system may contain instructions for closing geographic based steering control loops to maintain the platform line of sight pointing at a geographic position. The control system may contain instructions for computing parameters to step and stare a payload line of sight of a payload carried by the platform, within its limited range of motion, to limit, during an image integration period of the payload, relative rotational motion of the payload line of sight with respect to the earth caused by rotational motion of an orbiting aircraft carrying the platform stabilization system.

The support frame of the platform stabilization system may be carried by an outer gimbal assembly.

A method for isolating a payload from motion of a supporting structure comprises permitting limited linear movement of the platform relative to the support frame with three degrees of freedom along three orthogonal platform axes, permitting limited rotational movement of the platform relative to the support frame with three degrees of freedom about the three platform axes, and providing substantially greater resistance to linear movement of the platform relative to the support frame than to rotational movement of the platform relative to the support frame without rotationally constraining the platform.

BRIEF DESCRIPTION OF THE DRAWINGS

These and other features will become more apparent from the following description in which reference is made to the appended drawings wherein:

FIG. 9a shows the platform stabilization system of FIG. 1 installed in a first exemplary two-axis outer gimbal assembly;

FIG. 9b shows the platform stabilization system of FIG. 1 installed in an exemplary three-axis outer gimbal assembly;

FIG. 9c shows the platform stabilization system of FIG. 1 installed in a second exemplary two-axis outer gimbal assembly.

DETAILED DESCRIPTION

Figure 1:
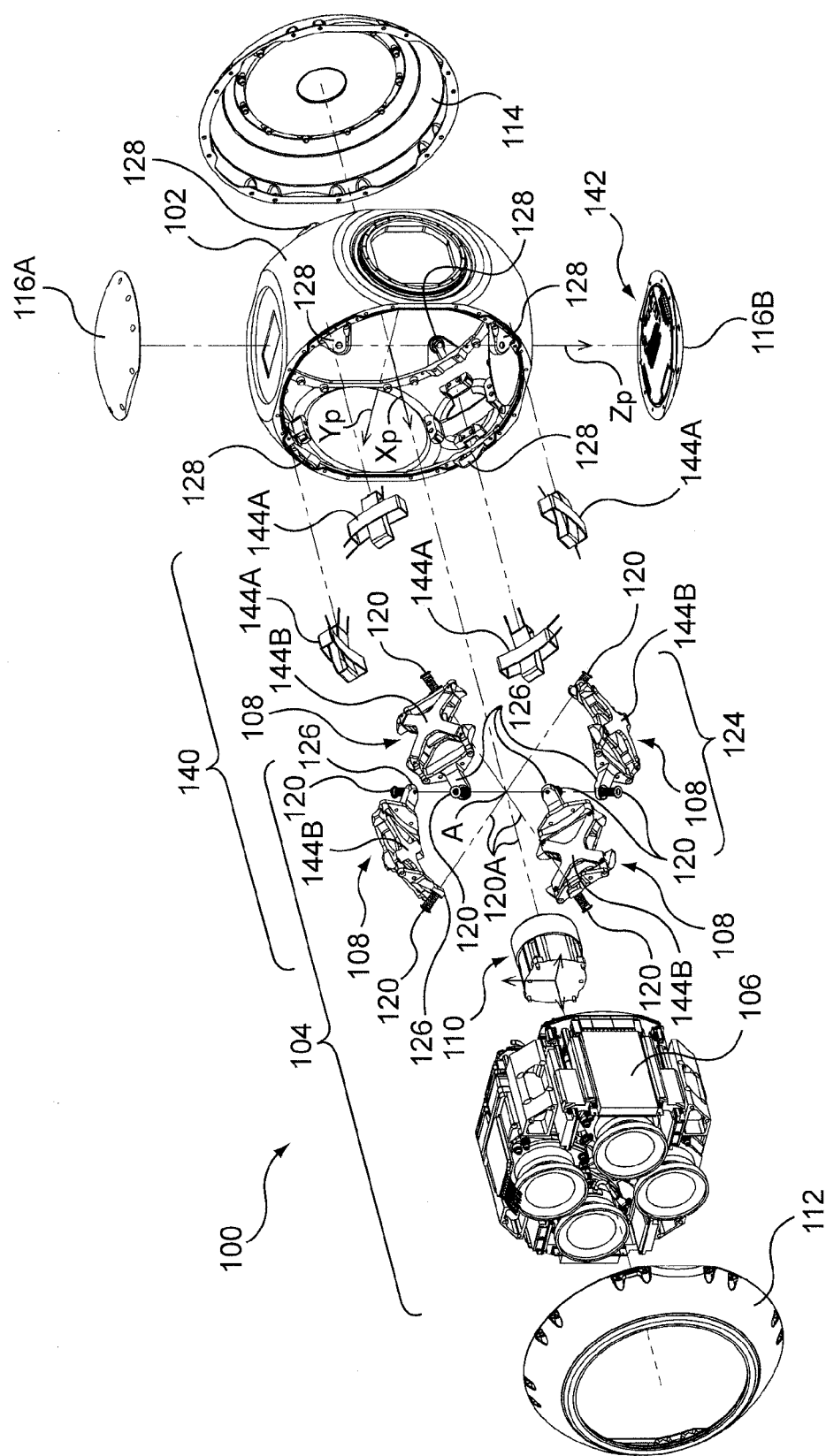
FIG. 1 is an exploded perspective view of an exemplary platform stabilization system.

The present disclosure describes several exemplary embodiments of a platform stabilization system for isolating a payload from the motion of a supporting structure, such as an aircraft or other vehicle or a fixed emplacement subject to movement, for example caused by wind. The platform stabilization system generally comprises a support frame, a platform adapted to carry a payload and a plurality of isolators each extending directly between the support frame and the platform, and also preferably comprises an active drive system acting directly between the support frame and the platform. As used herein, the term "isolator" means a device connecting two masses and whose structure acts to decouple the vibratory motions of each mass. As such, a single isolator may comprise one isolation element or a plurality of isolation elements coupled to one another to operate in concert. The isolators cooperate to form an isolation array, preferably an attitude-independent isolation array, supporting the platform directly within the support frame and in which the platform is not rotationally constrained by the isolation array. The term "isolation array", as used herein, refers to an array of spatially separated isolators configured to support a mass mounted to another mass such that the vibratory motions of the masses are decoupled from one other. The term "directly between the support frame and the platform" and similar terms, as used herein in reference to the isolators and the active drive system and its components, means that aside from the isolators and active drive system components, there are no intervening gimbals, rings or other motion-constraining structures between the platform and the support structure. Similarly, the term "supporting the platform directly within the support frame", as used in reference to the isolation array, means that it is the isolation array alone that supports the platform within the support frame, without the use of intervening gimbals, rings or other rotational constraints; that is, only the isolators support the platform within the support frame and the platform is otherwise unsupported within the support frame. For example, while electrical wiring may extend between the platform and the support frame, such wiring does not support the platform in the support frame. While the platform and the support frame will include features for mounting the isolators and active drive system components, when the platform stabilization system is assembled such features are generally fixed relative to the platform and support frame, respectively. As such, when construing the terms "directly between the support frame and the platform" and "supporting the platform directly within the support frame", these mounting features may therefore be considered part of the platform and support frame, respectively. Moreover, the terms "platform" and "support frame", as used herein, do not encompass structures that include gimbals, rings or other rotational constraints as part of a mechanical coupling between the support frame and the platform. Furthermore, the term "rotationally constrained", as used herein, refers to a condition in which motion of one body relative to another is limited to rotation about one or more axes without significant linear motion; the mechanical arrangement which causes one body to be rotationally constrained relative to another is referred to herein as a "rotational constraint". In this context, the term "significant linear motion" means linear motion beyond that permitted by the inherent tolerances of the rotational constraint. The gimbals and rings used in conventional platform stabilization systems are examples of rotational constraints. When one body is not rotationally constrained relative to another body, it can be said to be "rotationally unconstrained". The term "rotationally constraining" refers to the act of imposing rotational constraint. Thus, the platform support systems as described herein avoid the conventional arrangement in which a rotational constraint is arranged in series with a linear isolation structure; instead the isolation arrays described herein support the platform directly within the support frame and do not rotationally constrain the platform.

Reference is now made to FIG. 1, in which a first exemplary platform stabilization system is indicated generally by reference 100. The exemplary platform stabilization system 100 comprises a support frame 102 and a platform 104 carrying a payload in the form of a sensor package 106, four mounting structures 108 secured to the sensor package 106 at 90 degree intervals thereabout, and an inertial measurement unit 110 disposed in the platform 104. Thus, while mounted to the sensor package 106, the mounting structures 108 and the inertial measurement unit 110 are part of the platform 104. One or more sensors within the sensor package 106 may be independently steerable relative to the sensor package 106 and hence may be independently steerable relative to the platform 104. While the steering mechanism within the sensor package 106, or other elements of the payload, may include rotational constraints as part of their mechanisms, these rotational constraints would not form part of a mechanical coupling between the support frame and the platform.

In the aerospace and navigation fields the "NED" coordinate system is typically used, in which the X, Y and Z axes are mapped to North, East and Down. This is extended to an aircraft as X, Y and Z, where the positive direction of the X axis is along the fuselage towards the nose, the Y axis is perpendicular to the X axis and positive in the direction of the right wing and the Z axis is perpendicular to the X and Y axes and positive in the down direction during level flight. This coordinate reference frame is extended to a platform stabilization system with the X axis generally being the line of sight of the payload, the Y axis being toward the right side of the payload relative to the line of sight, and the Z axis toward the bottom of the payload relative to the line of sight. This means that the X axis is the roll axis, the Y axis is the pitch axis and the Z is the yaw axis. The terms "platform axis" and "platform axes", as used herein, refer to these roll (X), pitch (Y) and yaw (Z) axes, held fixed relative to the support frame to provide a coordinate frame of reference for movement of the platform relative to the support frame, and the designations $X_P$, $Y_P$ and $Z_P$ are used to denote the roll (X), pitch (Y) and yaw (Z) axes, respectively. One skilled in the art will appreciate that when implementing a control system 142, a different frame of reference may be used; for example the roll (X), pitch (Y) and yaw (Z) axes may be held fixed relative to the platform.

The supporting structure to which the support frame 102 is secured may be carried by a vehicle such as an aircraft or sufficiently tall fixed structure, and the sensor package 106 may be, for example, an imaging system or other sensor array. Front and rear fittings 112, 114, respectively, may be fitted to the support frame 102 to provide a sealed environmental enclosure. In the illustrated embodiment, electronic components for a control system 142, described further below, are disposed inside of the upper and lower platform stabilization electronics assemblies 116A and 116B on the support frame 102. In alternate embodiments the control system may be disposed outside of the enclosure, or partly inside and partly outside the enclosure. The entire platform stabilization system 100 is securable to a supporting structure such as an outer gimbal assembly, as is known in the art, configured to permit the support frame 102 a large amount of angular movement relative thereto about at least one, but preferably two or three orthogonal axes. FIG. 9a shows the exemplary platform stabilization system 100 installed in a first exemplary two-axis yaw/pitch (or azimuth/elevation) outer gimbal assembly 118a, FIG. 9b shows the exemplary platform stabilization system 100 installed in an exemplary three-axis yaw/roll/pitch outer gimbal assembly 118b, and FIG. 9c shows the exemplary platform stabilization system 100 installed in a second exemplary two-axis outer gimbal assembly 118c, which is a two-axis roll/pitch, "look down" outer gimbal configuration. Thus, in certain preferred embodiments, the support frame 102 is carried by an outer gimbal assembly 118a, 118b, 118c. Notably, outer gimbal assemblies are used for gross steering of the platform stabilization system 100, and hence the stabilized platform 104, and need not provide any stabilization function.

Figure 2A:
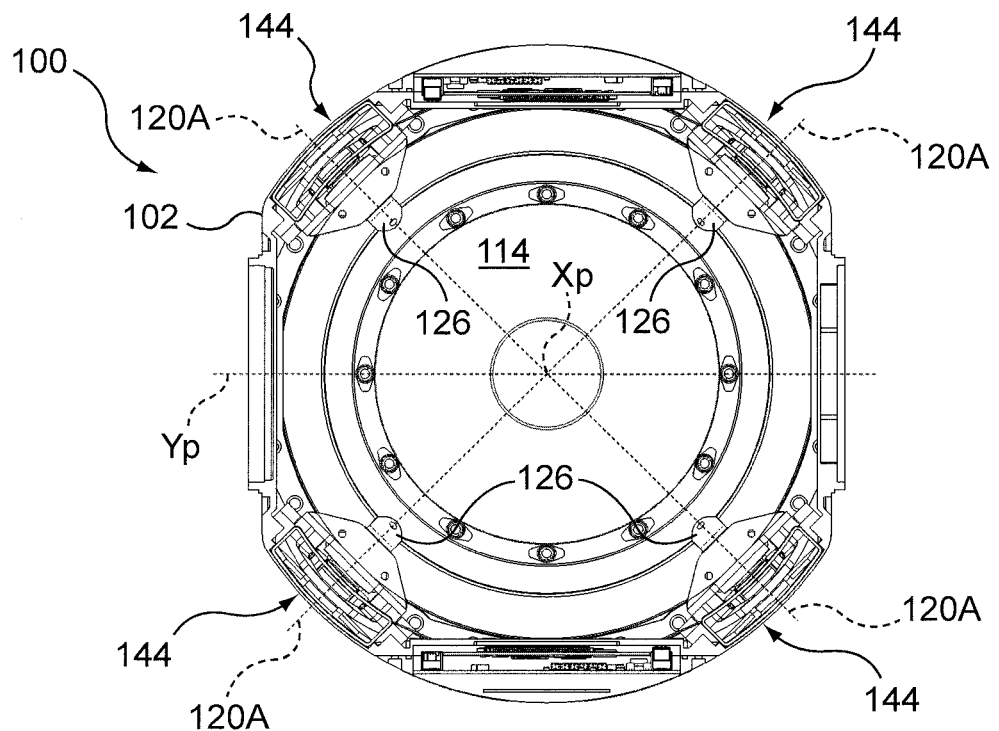
FIG. 2a is a front cross sectional view of the platform stabilization system of FIG. 1 with the sensor package removed.
Figure 2B:
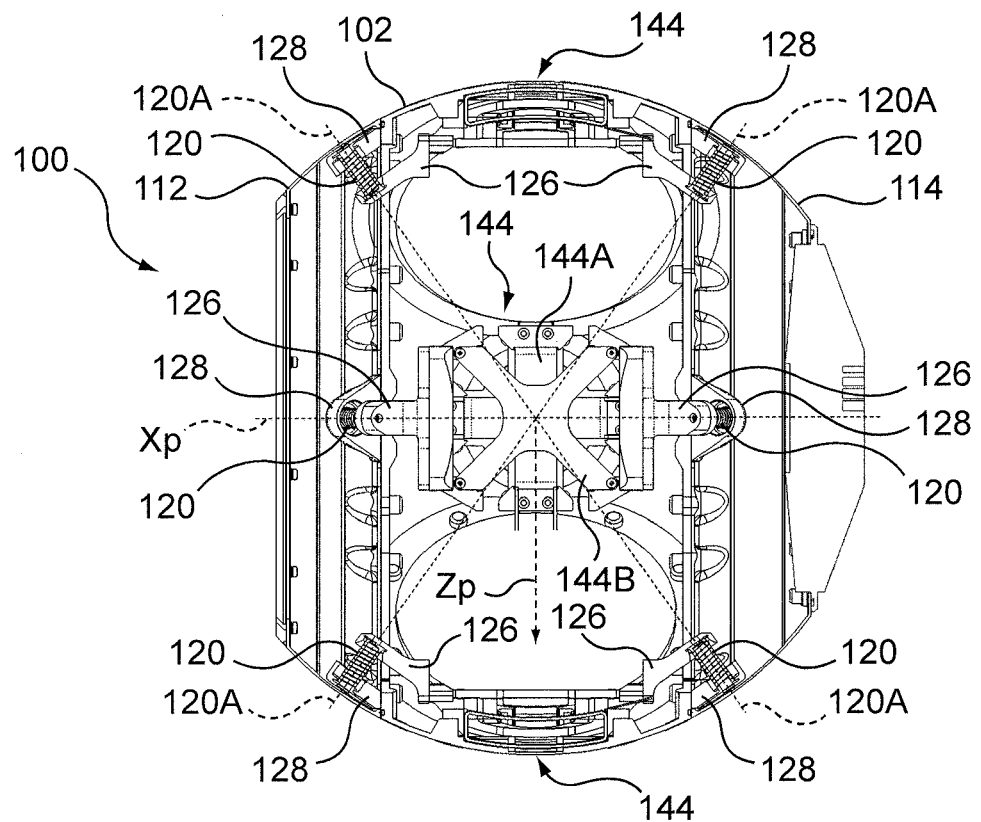
FIG. 2b is an angled side cross sectional view of the platform stabilization system of FIG. 1 with the sensor package removed.

The platform 104 is carried by the support frame 102 via a plurality of isolators 120. In the exemplary embodiment shown in FIG. 1, the isolators 120 are compression springs arranged with their respective spring axes 120A radiating outward substantially from a common point A within the platform 104 and extending directly between the support frame 102 and the platform 104. The common point A is the centroid of mass of the platform 104, including the mass of the sensor package 106. The spring axes 120A are shown more clearly in FIGS. 2a and 2b, which show, respectively, front and angled side cross sectional views of the platform stabilization system 100 with the sensor package 106 removed.

Each isolator 120 permits linear movement of the platform 104 relative to the support frame 102 with three degrees of freedom and also permits rotational movement of the platform 104 relative to the support frame 102 with three degrees of freedom. The isolators 120 cooperate to form a substantially symmetrical isolation array 124 supporting the platform 104 directly within the support frame 102 and providing six degrees of freedom to the platform 104, relative to the support frame 102. The isolation array 124 is preferably attitude-independent. As used herein, the term "attitude-independent" refers to an arrangement in which the travel limits in all directions substantially exceed 1 G for the isolation array as a whole.

The isolation array 124 spaces the platform 104 from the support frame 102 so that the platform 104 can move within the support frame, and provides passive isolation of motion of the platform 104 relative to the support frame 102. The platform 104 is not rotationally constrained by the exemplary isolators 120 or by the exemplary isolation array 124 formed by the isolators 120.

Figure 4A:
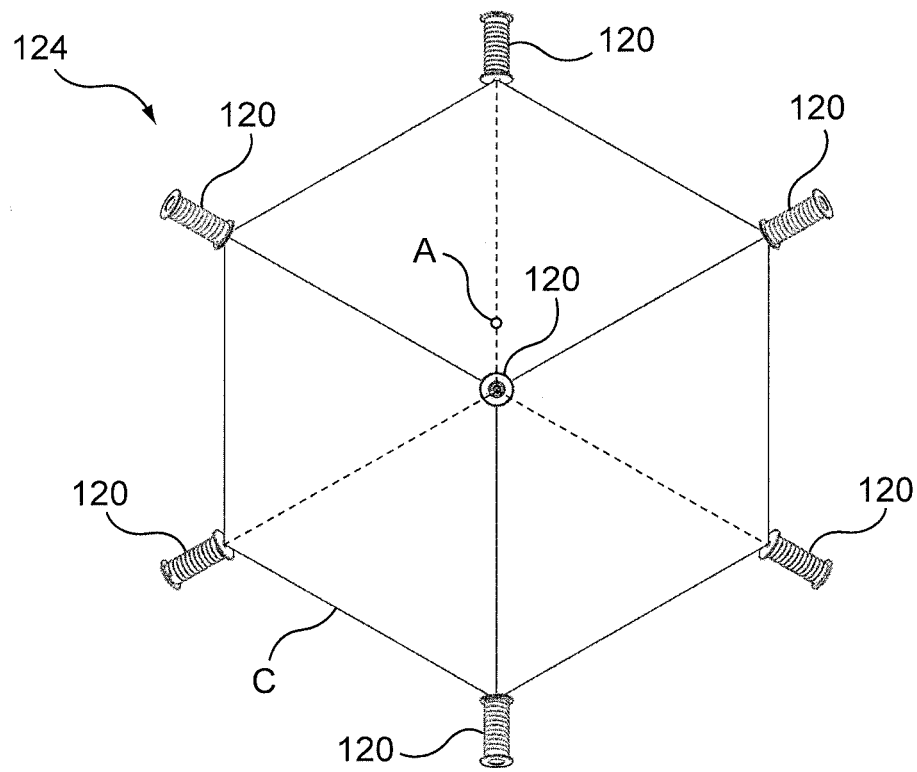
FIG. 4a is a schematic representation of a first cubic isolation array.
Figure 4B:
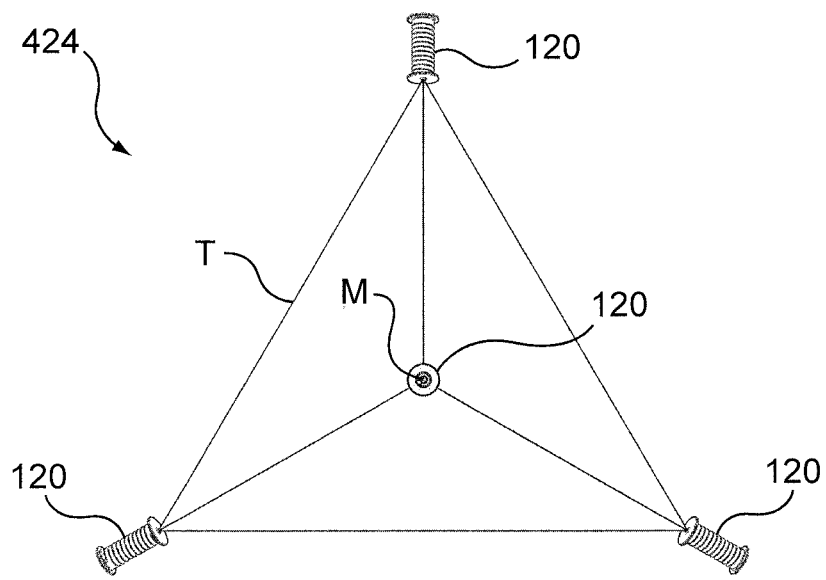
FIG. 4b is a schematic representation of a tetrahedral isolation array.

As shown schematically in FIG. 4a, in the particular exemplary platform stabilization system 100 shown in FIG. 1, the isolation array 124 is a cubic isolation array which comprises eight substantially identical compression springs 120 arranged at corners of a notional cube C, radiating outward substantially from the centroid A of the notional cube C, In other embodiments, the isolation array may comprise a different arrangement of compression springs as isolators, with suitable modification to the associated hardware. For example, FIG. 4b shows a schematic representation of a tetrahedral isolation array 424 comprising an array of four compression springs 120 arranged at corners of a notional regular tetrahedron T, with the compression springs 120 radiating outward substantially from the centroid M of the notional regular tetrahedron T. The cubic isolation array shown in FIG. 4a can be considered as being made up of two equally sized tetrahedral isolation arrays 424 as shown in FIG. 4b, super-imposed on one another with one of tetrahedral isolation arrays 424 rotated 180 degrees relative to the other, as shown in FIG. 4g, and any suitable combination of tetrahedral isolation arrays may be used. Other symmetrical isolator configurations will be apparent to one skilled in the art, now informed by the present disclosure. For example, as shown in FIG. 4h, an isolation array 424h may comprise six isolators 420h radiating outward from the centroid A of the notional cube C through the centroids $A_F$ of the six faces F of the notional cube C. Thus, where compression springs are used as isolators, the spring axes preferably radiate out substantially from a common point within the platform to produce a substantially balanced array of springs arranged in opposition to one another so that the isolation array 424h is attitude independent and has substantially the same spring rate for linear movement along the platform axes X, Y and Z (see FIG. 1). Accordingly, an isolation array may comprise any symmetrical array of compression springs arranged so that their spring axes radiate outwardly substantially from a common point within the periphery of the platform. The common point will generally be, or be very close to, the centroid of mass for the platform with the payload installed.

The compression springs 120 used as isolators in the first exemplary platform stabilization system 100 are preferably machined, multi-start, helical compression springs, which are monolithic structures machined to form two or more spring elements running in parallel. As such, a multi-start, helical compression spring may be considered as a plurality of individual spring elements acting in concert. The compression springs 120 are axially preloaded to produce a low, positive lateral spring rate, so that the isolation array 124 has a low rotational stiffness compared to its moderate linear stiffness. This is achieved by exploiting a columnar instability phenomenon in compression springs.

Figure 3A:
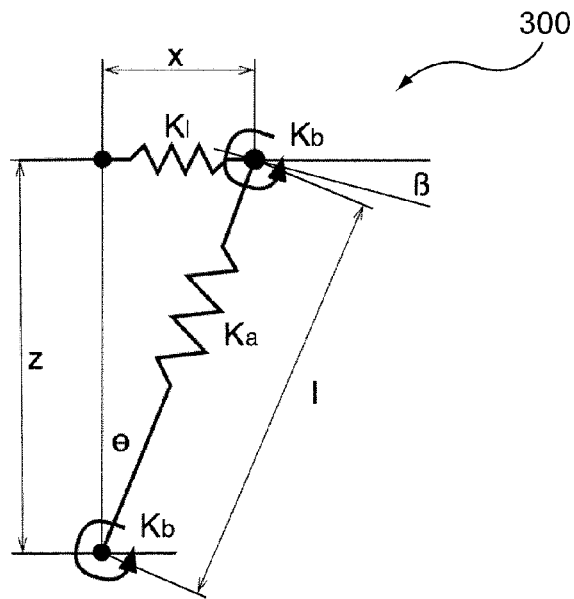
FIG. 3a shows a simplified mathematical model of a spring.

FIG. 3a shows a simplified mathematical model 300 of a spring, in which:

$K_a$ is the axial spring rate;
$K_l$ is the lateral spring rate;
$K_b$ is the bending spring rate;
$K_t$ (not shown in FIG. 3a) is the torsional spring rate;
x is lateral displacement;
z is operating height;
L is free length (not shown—free length is a standard specification for springs);
l is length;
θ is centerline cant; and
β is end cant.

In the simplified mathematical model 300 in FIG. 3a, the following equations apply:

Preload $F_a = K_a(L-l)$

Lateral $F_l = F_a \sin θ + K_l x + K_b(θ/z) + K_b(β/z)$

Figure 3B:
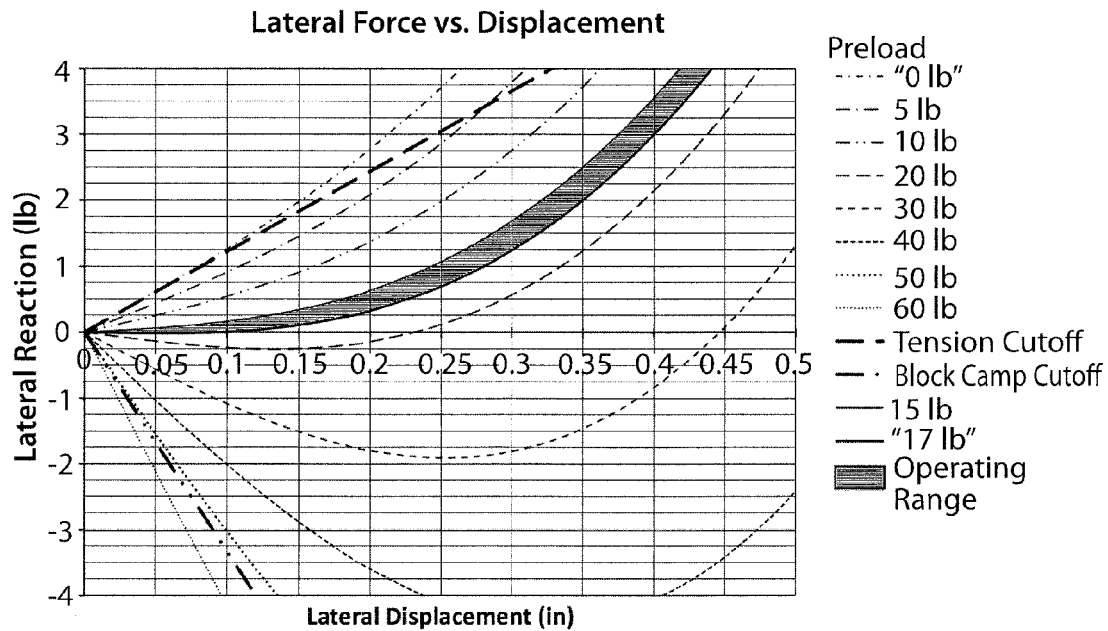
FIG. 3b is a graph showing the columnar instability phenomenon of a compression spring suitable for use in the isolation array of the platform stabilization system of FIG. 1.

As the ratio of a spring's length over its diameter increases, when the spring preload is increased the lateral spring rate will decrease as shown in FIG. 3b, based on the mathematical model of the spring shown in FIG. 3a. Preload curves that cross the X axis and hence have negative Y values are laterally unstable while preload curves that do not cross the X axis and hence have positive Y values are considered stable. Regions of operation where the lateral spring rate is negative are typically avoided in conventional applications. When the springs 120 are arranged as shown in FIG. 4a or 4b with the springs 120 having a negative spring rate, the lateral instability of each individual spring results in rotational instability for the isolation array as a whole. By selecting a preload that results in a low, positive lateral spring rate for each spring 120, i.e. a preload that is close to but does not cross the X axis, the isolation array 124, 424 can be configured to achieve the desired low rotational and moderate linear characteristics, permitting the platform 104 a limited amount of angular movement about and linear movement along the three orthogonal X, Y and Z platform axes shown in FIG. 1, without the use of gimbals or gimbal rings and their associated mechanical accoutrements. Thus, the isolation array 124, 424 will permit limited linear movement of the platform 104 relative to the support frame 102 with three degrees of freedom along the platform axes $X_P$, $Y_P$ and $Z_P$ and will permit limited rotational movement of the platform 104 relative to the support frame 102 with three degrees of freedom about the platform axes $X_P$, $Y_P$ and $Z_P$, and is substantially more resistant to linear movement of the platform 104 relative to the support frame 102 than to rotational movement of the platform 104 relative to the support frame 102.

Preferably, an isolation array for use in a platform stabilization system, such as the isolation arrays 124, 424 described above and the isolation arrays 424C, 424D described below, configured for a given linear stiffness, has an undamped natural frequency for linear movement of the platform along the platform axes $X_P$, $Y_P$ and $Z_P$ that is at least two times an undamped natural frequency for rotational movement of the platform about the platform axes $X_P$, $Y_P$ and $Z_P$. More preferably, the undamped natural frequency for linear movement of the platform along the platform axes $X_P$, $Y_P$ and $Z_P$ is at least three times the undamped natural frequency for rotational movement of the platform about the platform axes $X_P$, $Y_P$ and $Z_P$. Even more preferably the undamped natural frequency for linear movement of the platform along the platform axes $X_P$, $Y_P$ and $Z_P$ is at least five times the undamped natural frequency for rotational movement of the platform about the platform axes $X_P$, $Y_P$ and $Z_P$, and still more preferably the undamped natural frequency for linear movement of the platform along the platform axes $X_P$, $Y_P$ and $Z_P$ is at least ten times the undamped natural frequency for rotational movement of the platform about the platform axes $X_P$, $Y_P$ and $Z_P$. While the undamped natural frequency for linear movement of the platform along the platform axes $X_P$, $Y_P$ and $Z_P$ may need to be adjusted to suit a particular application, the undamped natural frequency for rotational movement of the platform about the platform axes $X_P$, $Y_P$ and $Z_P$ should be as low as practically possible. However, it is not necessary to increase the undamped natural frequency for linear movement of the platform along the platform axes $X_P$, $Y_P$ and $Z_P$ beyond the demands of the application solely to obtain a ratio of linear to rotational stiffness.

Figure 3C:
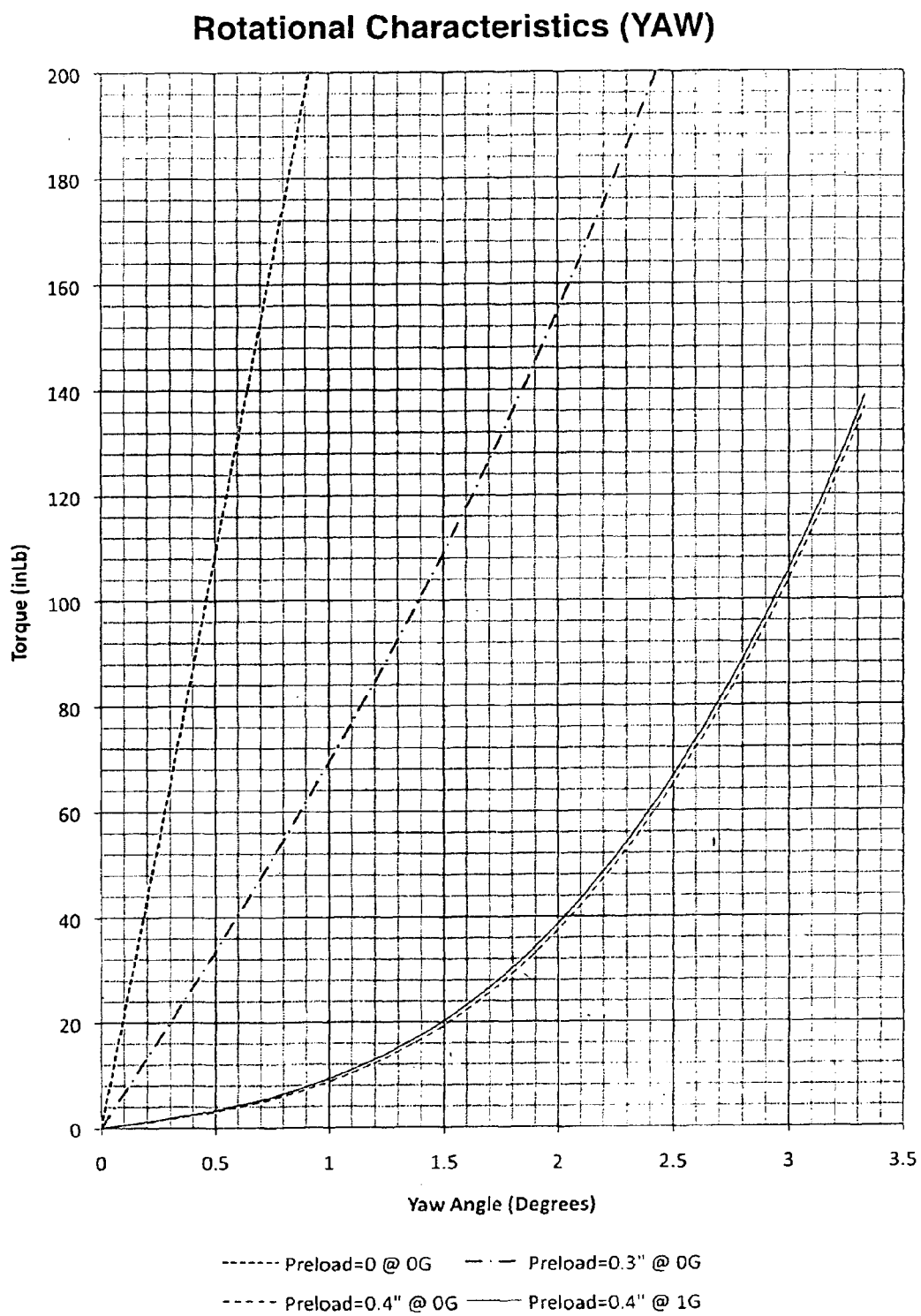
FIG. 3c is a graph showing the rotational characteristics of an exemplary embodiment of the isolation array of the platform stabilization system of FIG. 1.

FIG. 3c shows the rotational characteristics of an exemplary embodiment of the isolation array depicted in FIGS. 1 and 4a. In this exemplary embodiment, the individual isolators 120 were each dual start machined springs with an axial spring rate of about 180 lb/in, a lateral spring rate of about 30 lb/in unloaded and about 10 lb/in when preloaded, a bending spring rate of about 0.35 inlb/deg, a torsional spring rate of about 0.25 inlb/deg, and a free length to diameter ratio of about 3.7. The test payload weight was about 20 pounds. This resulted in a system with an undamped natural frequency of about 15 Hz for linear movement along the platform axes $X_P$, $Y_P$ and $Z_P$ and about 1.5 Hz for rotational movement of the platform about the platform axes $X_P$, $Y_P$ and $Z_P$; thus, the undamped natural frequency for linear movement along the platform axes $X_P$, $Y_P$ and $Z_P$ is at least ten times the undamped natural frequency for rotational movement of the platform about the platform axes $X_P$, $Y_P$ and $Z_P$. These are suitable characteristics for an airborne platform stabilization system.

As can be seen in FIG. 1, the isolators 120 each extend directly between the support frame 102 and the platform 104, which includes the four mounting structures 108. As noted above, while the platform and the support structure may include features for mounting the isolators, such as the mounting structures 108 and the mounting projections 128, these components form part of the platform and support structure, and moreover do not constrain the motion of the platform.

Figure 6A:
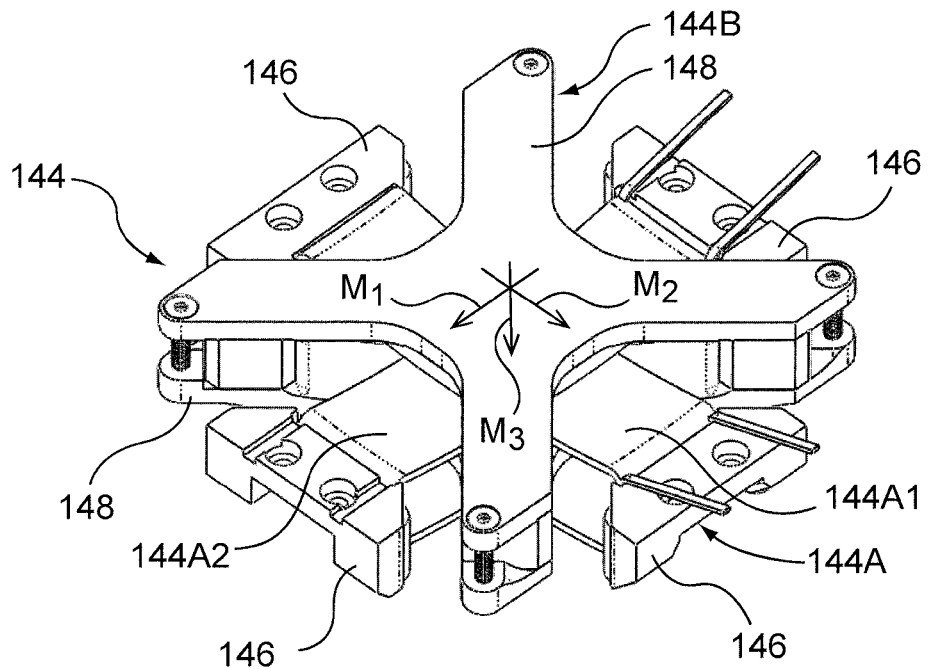
FIG. 6a is a detailed perspective view of an exemplary two-axis voice coil actuator.
Figure 6B:
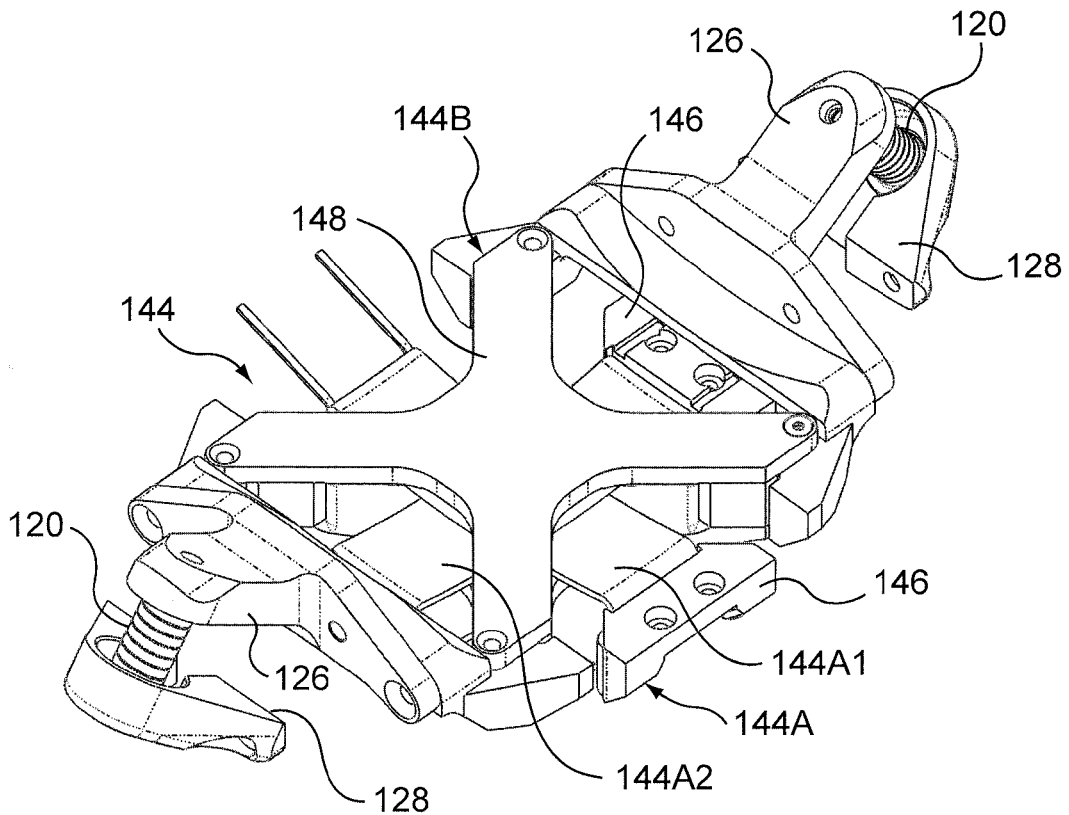
FIG. 6b is a detailed perspective view of the voice coil actuator of FIG. 6a integrated into an exemplary mounting structure that is positioned in registration with mounting projections of the support structure of the platform stabilization system of FIG. 1.

As best seen in FIG. 6b although also shown in FIG. 1, in the exemplary illustrated embodiment the mounting structures 108 each have opposed outwardly extending fingers 126 and the support frame 102 includes four sets of opposed outwardly extending mounting projections 128 each spaced 90 degrees apart. When the platform stabilization system 100 is assembled, the fingers 126 on the mounting structures 108 and the mounting projections 128 are in registration with one another so that there are opposed pairs of fingers 126 and mounting projections 128 arranged at 90 degree intervals on either side of the support frame 102. The fingers 126 and the mounting projections 128 each have a respective recess for receiving an end of one of the isolators 120, with the recesses opposed to one another, and each isolator 120 extends between a respective finger 126 and mounting projection 128 and thus directly between the support frame 102 and the platform 104.

The exemplary isolation array 124, as well as the other exemplary isolation arrays described further below, serve a dual role in providing passive linear isolation with three degrees of freedom while also functioning as a three degree of freedom flexural pivot in the platform stabilization system.

The role of passive isolation in platform stabilization systems is to attenuate the vibration input to the system, thus reducing the workload on the control system. The purpose of damping in the passive isolator is to limit the dynamic amplification at resonance (see FIG. 7, discussed below). Mechanical damping techniques work across all frequencies and create coupling forces that can disturb the payload's line of sight. Active damping can make use of the control system to apply damping using the "sky hook" technique, which is well known in the art. U.S. Pat. No. 3,606,233 to Scharton et al., U.S. Pat. No. 4,531,699 to Pinson and U.S. Patent Application Publication No. 2008/0158371A1 in the name of Trescott are examples of active damping of a passive isolator.

Traditional mechanical damping is unsuitable for the isolation arrays described herein because damping across the rotational pivot should be avoided and the isolation arrays described herein extend directly between the platform and the support structure; there is no gimbal system in series to decouple the platform rotationally from the damping. As a result, it would be difficult to apply mechanical damping to the linear motion of the platform without also applying it to the rotational motion, and rotational damping would couple disturbing forces to the platform. U.S. Pat. No. 5,897,223 to Tritchew et al. and U.S. Pat. No. 7,320,389 to Meyers et al. describe the use of an array of mechanical dashpot dampers mounted on ball joint pivots to apply damping predominantly to the linear motion of the isolator, however, this would be unsuitable for use in the presently disclosed platform stabilization system because the friction in the ball joint pivots would couple disturbing rotational forces through to the payload. Accordingly, when active damping is applied to isolation arrays as taught by the present disclosure, an active drive system comprising a six degree of freedom voice coil actuator array is used to apply damping forces to the linear axes only while it stabilizes the platform's line of sight in the three rotational degrees of freedom. Isolators of the type shown in FIG. 4d (described below) are capable of providing some or all of the required damping passively.

Thus, the exemplary platform stabilization system 100 further comprises an active drive system 140 (see FIGS. 1, 5a and 8) acting directly between the support frame 102 and the platform 104, and a control system 142 (see FIG. 8) coupled to the active drive system 140 for receiving sensor input and controlling the active drive system in response to the sensor input. The term "active drive system", as used herein, refers to a system for causing controlled movement of the platform 104 relative to the support frame 102. As will be explained in greater detail below, the control system 142 uses the sensor input to control the active drive system 140 for active damping and stable motion of the platform 104 relative to the support frame 102. In the exemplary platform stabilization system 100, the active drive system 140 is a six degree of freedom active drive system that can selectively drive linear movement of the platform 104 relative to the support frame 102 along the orthogonal platform axes $X_P$, $Y_P$ and $Z_P$ and can selectively drive rotation of the platform 104 relative to the support frame 102 about the platform axes $X_P$, $Y_P$ and $Z_P$. The use of a six degree of freedom active drive system in parallel with a six degree of freedom isolation array such as the isolation array 124 enables the use of passive, and even undamped, isolators, since the drive system can also provide damping forces.

In the illustrated embodiment of the exemplary platform stabilization system 100, the active drive system 140 comprises four two-axis magnetic voice coil actuators 144 (see FIG. 5a) arranged approximately 90 degrees apart on a circumference of a notional circle S. As best seen in FIGS. 1, 6a and 6b, each magnetic voice coil actuator 144 comprises a first portion 144A carried by the support frame 102 and a second portion 144B carried by the platform 104. In the illustrated embodiment, each magnetic voice coil actuator 144 comprises a coil portion 144A carried by the support frame 102 and a magnetic structure portion 144B carried by the platform 104; in other embodiments the relative positions of the coil portions and magnetic structure portions could be reversed Each coil portion 144A comprises two electrically energizable coils 144A1, 144A2 (FIGS. 6a and 6b), in the form of loops arranged orthogonally to one another and secured to the interior surface of the support frame 102 by coil retaining members 146. Each magnetic structure portion 144B comprises a pair of spaced-apart X-shaped plates 148 carried by the platform 104, with each plate 148 having one or more magnets to create a magnetic flux field within a gap between the plates 148. During assembly of the platform stabilization system 100, the coils 144A1, 144A2 and magnetic structure portions 144B are arranged so that the outermost plate 148 is disposed within the loops formed by the coils 144A1, 144A2 and the innermost parts of the loops formed by the coils 144A1, 144A2 are disposed between the plates 148. The magnetic voice coil actuators 144 shown and described are merely exemplary, and other types of magnetic voice coil actuators may also be used.

The control system 142 is coupled to the magnetic voice coil actuators 144 via platform servo drives 180 (FIG. 8), which receive and amplify the control signals from the control system 142 and transmit electric current to the respective coils 144A1, 144A2 of the respective magnetic voice coil actuators 144. Thus, the control system 142 can control energization of the magnetic voice coil actuators 144 to apply controlled moments and linear forces to the platform 104.

As shown in FIG. 6a, each magnetic voice coil actuator 144 has two substantially orthogonal motor axes $M_1$ and $M_2$ along which a platform positioning force can be applied but has freedom of movement along the third motor axis $M_3$, which is substantially orthogonal to the other two motor axes $M_1$ and $M_2$. Thus, each magnetic voice coil actuator 144 acts between the support frame 102 and the platform 104 to apply a first platform positioning force to the platform along its first motor axis $M_1$ and apply a second platform positioning force to the platform along its second motor axis $M_2$ while permitting free linear movement of the platform along its third motor axis $M_3$. At the same time, each magnetic voice coil actuator 144 permits free rotation of the platform 104 about its three motor axes $M_1$, $M_2$ and $M_3$. The term "free", as used in the context of linear motion along and rotational motion about the motor axes $M_1$, $M_2$ and $M_3$ is to be understood as being free within the limited range of motion imposed by the physical structure of the magnetic voice coil actuator, including physical stops used to impose that limited range of motion. Moreover, it is to be understood that the isolation array 124 supports the platform 104 within the support frame 102 such that the coils 144A1, 144A2 of the magnetic voice coil actuators 144 are spaced from the plates 148 thereof and as such the magnetic voice coil actuators 144 provide no support function. Thus, the magnetic voice coil actuators 144 do not support the platform 104 within the support frame 102; the platform 104 is supported only by the isolation array 124.

Figure 5A:
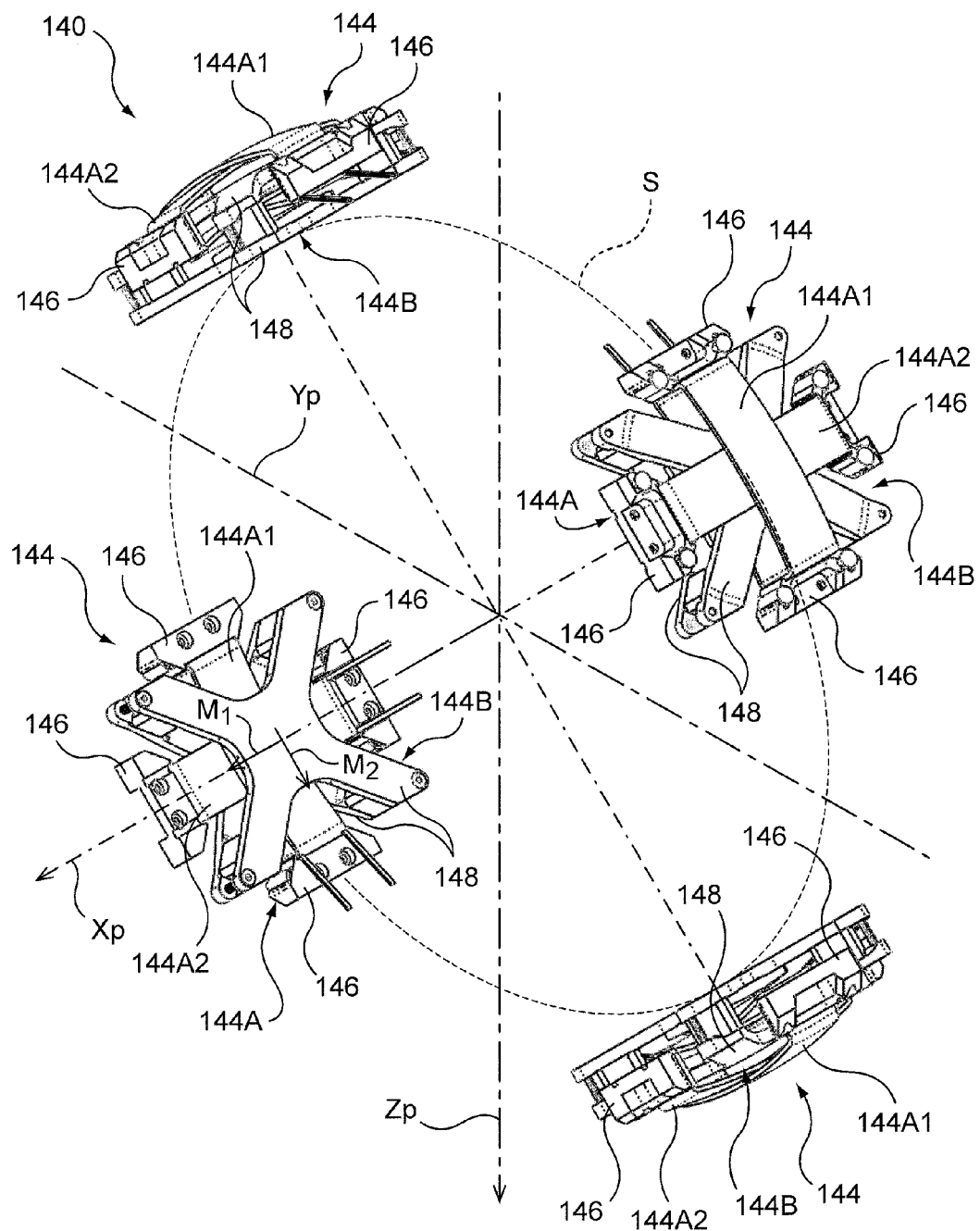
FIG. 5a shows the relative positions and orientations of the voice coil actuators in an exemplary active drive system comprising four two-axis voice coil actuators.

As can be seen in FIGS. 1 and 5a, the magnetic voice coil actuators 144 are arranged relative to the platform 104 for selectively driving linear movement of the platform 104 relative to the support frame 102 along the orthogonal platform axes $X_P$, $Y_P$ and $Z_P$ and for selectively driving rotation of the platform 104 relative to the support frame 102 about the platform axes $X_P$, $Y_P$ and $Z_P$. More particularly, and referring now specifically to FIG. 5a, when a current is passed through the coil 144A1 it creates an electromotive force along motor axis $M_1$. Similarly, when a current is passed through coil 144A2 it creates an electromotive force along axis $M_2$. Motor axis $M_3$ represents the general direction of the magnetic flux field, in the gap between the plates 148 of the magnetic structure 144B, used to create these electromotive forces. It can be seen that if coil 144A1 on all of the magnetic voice coil actuators 144 were energized with the same polarity of current the combined force vector would be along the platform axis $X_P$, parallel to the motor axis $M_1$ of each magnetic voice coil actuator 144. However, if the polarity of the current in the lower two magnetic voice coil actuators 144 were reversed their forces would be in the negative direction of each of their motor axes $M_1$ axis. The linear forces cancel and create a moment about the platform axis $Y_P$, which in the exemplary embodiment is the pitch axis. Thus, by changing the polarity of the current in the coils 144A1, 144A2, the active drive system 140 can produce linear forces and rotational moments. The linear forces are used for damping and the rotational moments are used to stabilize the line of sight, which has particular application when the platform 104 carries a sensor array as a payload.

Figure 8:
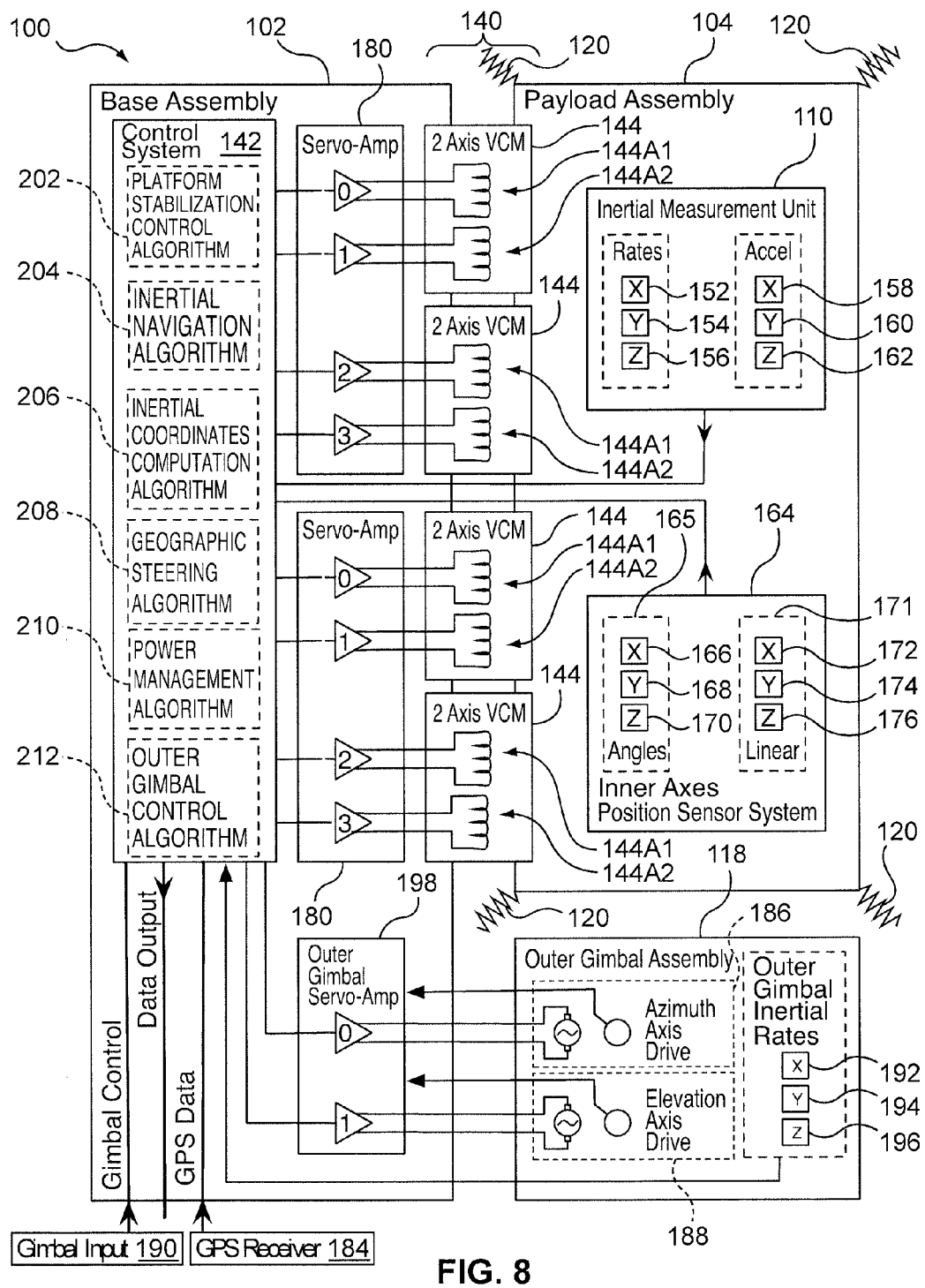
FIG. 8 is a schematic diagram of the platform stabilization system of FIG. 1 including the active drive system and the control system.

As noted above, in the illustrated embodiment an inertial measurement unit 110 is disposed in the platform 104. As shown schematically in FIG. 8, the inertial measurement unit 110 comprises three inertial rate sensors 152, 154, 156, preferably fibre-optic gyro based sensors, which provide signals representing the angular movement of the platform 104 about the pre-determined platform axes $X_P$, $Y_P$ and $Z_P$ (see FIGS. 1 and 6a) which are defined relative to the support frame 102. Preferably, as shown in FIG. 8, the inertial measurement unit 110 carried by the platform 104 also includes three inertial acceleration sensors 158, 160, 162, which provide signals representing the linear movement of the platform 104 along the platform axes $X_P$, $Y_P$ and $Z_P$. The inertial rate sensors 152, 154, 156 and the inertial acceleration sensors 158, 160, 162 are coupled to the control system 142, and the signals generated by the inertial rate sensors 152, 154, 156 and the inertial acceleration sensors 158, 160, 162 are delivered to the control system 142. Thus, the inertial measurement unit 110 is coupled to the control system 142 and can sense and provide signals indicative of linear and angular movement of the platform relative to the platform axes $X_P$, $Y_P$ and $Z_P$. Although three inertial rate sensors and three inertial acceleration sensors are shown in FIG. 8, other embodiments may include more than three inertial rate sensors and/or more than three inertial acceleration sensors.

Preferably, the platform stabilization system 100 also includes a position sensor system 164 carried by the platform 104 and comprising an angle sensor system 165 and a linear position sensor system 171. The angle sensor system 165 senses and provides a signal indicative of the angular position of the platform 104 relative to the support frame and comprises three angular position sensors 166, 168 and 170 which provide respective signals representing the angular position of the platform 104 relative to the platform axes $X_P$, $Y_P$ and $Z_P$. Analogously, the linear position sensor system 171 senses and provides a signal indicative of the linear position of the platform 104 relative to the support frame 102 and comprises three linear position sensors 172, 174 and 176 which provide respective signals representing the linear position of the platform 104 along the platform axes $X_P$, $Y_P$ and $Z_P$. The position sensor system 164 is also coupled to the control system 142 to deliver sensor input thereto.

The control system 142 can use the inputs from the inertial measurement system 110 and/or the position sensor system 164 to drive the magnetic voice coil actuators 144, via the platform servo drives 180, to provide active damping of motion of the platform 104 relative to the support frame 102. The platform stabilization system 100 preferably further includes a global positioning system (GPS) receiver 184 coupled to the control system 142 in communication therewith. The GPS receiver 184 may be disposed on a fixed (non-yawing) portion of an outer gimbal (e.g. outer gimbal assembly 118a, 118b, 118c in FIG. 9), or inside an aircraft carrying the platform stabilization system 100. The GPS receiver 184 may be fixed to the top of the aircraft to have a good field of view of the GPS satellites. Typically the GPS receiver 184 would not be positioned within the enclosure formed by the front and rear fittings 112, 114 and the support frame 102 because the enclosure is typically electromagnetically shielded, but the GPS receiver 184 may be placed inside such an enclosure if it is unshielded. The control system 142 can therefore implement an inertial navigation procedure using the signals from the inertial measurement unit 110 and the GPS receiver 184 to compute the geographic location of the intersection of the payload's line of sight with the earth's surface. In this context, the term "the earth's surface" includes not only a point on the actual surface of the earth but also a point at a specified height above the earth's surface; this point is often referred to as the "target". The control system 142 can also use the signals from the inertial measurement unit 110 and the GPS receiver 184 to close steering loops on a geographic position or vector, without the use of image based auto-trackers. This geographic based steering enables platform stabilization systems according to the present disclosure to operate autonomously for many surveillance applications such as wide area persistent surveillance. The control system 142 also contains instructions for computing the required steering parameters to drive the magnetic voice coil actuators 144 to "step" and "stare" the payload's line of sight, within its limited range of motion, to minimize the relative rotational motion of the line of sight with respect to the earth, during the image integration period of a given payload, caused by the rotational motion of an orbiting aircraft carrying the platform stabilization system 100. This is particularly well suited to the very high pixel count imagers used in wide area persistent surveillance applications.

As noted above, the entire platform stabilization system 100 is securable to an outer gimbal assembly, denoted by reference 118 in FIG. 8, and the control system 142 preferably also controls the outer gimbal assembly 118. The outer gimbal assembly 118 includes at least an azimuth axis drive 186 and an elevation axis drive 188 and for a three-axis outer gimbal assembly will also include a roll axis drive (not shown in FIG. 8). The outer gimbal assembly 118 also includes outer gimbal inertial rate sensors 192, 194, 196 coupled to the control system 142. The control system 142 is coupled to the azimuth axis drive 186 and the elevation axis drive 188, and to the roll axis drive when present, via one or more outer gimbal servo drives 198. The control system 142 receives gimbal control signals from a gimbal control input source 190, such as a controller on an aircraft carrying the platform stabilization system 100 and outer gimbal assembly 118, and also receives sensor signals from the outer gimbal inertial rate sensors 192, 194, 196, and uses this input to drive the azimuth axis drive 186 and the elevation axis drive 188, as well as the roll axis drive when present.

The control system 142 may be a general purpose computer, a special purpose computer, or other programmable data processing apparatus and functions as an instruction execution system which implements instructions for controlling the magnetic voice coil actuators 144 and for controlling the azimuth axis drive 186 and the elevation axis drive 188, as well as the roll axis drive in the case of a three-axis outer gimbal assembly. The control system 142 may be implemented as any suitable combination of hardware and software. In the exemplary platform stabilization system 100, the control system 142 executes instructions including a platform stabilization control algorithm 202, an inertial navigation algorithm 204, an inertial coordinates computation algorithm 206, a geographic steering algorithm 208, a power management algorithm 210 and an outer gimbal control algorithm 212.

In a typical implementation of the platform stabilization control algorithm 202, the control system 142 would accept data derived from external gimbal control input from the gimbal control input source 190 representing the desired yaw, pitch, and roll line of sight (LOS) rates and compare them to the measured LOS rates returned by the inertial acceleration sensors 158, 160, 162 in the inertial measurement unit 110 to produce an error signal. The desired yaw, pitch, and roll line of sight (LOS) rates may be calculated from the external gimbal control input or by the geographic steering algorithm 208 described below. The control system 142 may implement a proportional-integral-derivative (PID) type controller to calculate the demanded yaw, pitch, and roll torques required to stabilize the LOS based on the computed error signal. A PID controller calculates the difference between a measured value and a desired value as an error signal and then modifies the input variables in an attempt to reduce the error. Other types of controllers may also be used. The currents required, in each coil 144A1, 144A2 of the magnetic voice coil actuators 144 forming the active drive system 140, to produce the demanded torques is then calculated based on the electromagnetic characteristics of the magnetic voice coil actuators 144 and the geometry of the active drive system 140. The platform servo drives 180 then ensure that the coils 144A1, 144A2 of the magnetic voice coil actuators 144 are supplied the correct current to produce the correct electromotive forces to produce the required torques to stabilize the line of sight. This process is typically repeated thousands of times per second.

In a typical implementation of the inertial navigation algorithm 204, the control system 142 would accept GPS data (time, location and velocity) from the GPS receiver 184, internal rate and acceleration data from the inertial measurement unit 110, angular position data from the position sensor system 164 and angular position data from the outer gimbal inertial rate sensors 192, 194, 196. The angular position data from the position sensor system 164 and outer gimbal inertial rate sensors 192, 194, 196 are used to resolve the GPS data into the coordinate frame of the inertial measurement unit 110. The inertial position, velocity and acceleration for the inertial measurement unit 110 are then computed using standard inertial navigation system (INS) algorithms as are known in the art. The data from the position sensor system 164 and outer gimbal inertial rate sensors 192, 194, 196 are then used to back-compute the inertial position, attitude, heading and track for a vehicle (e.g. an aircraft) carrying the platform stabilization system.

In a typical implementation of the inertial coordinates computation algorithm 206, the control system 142 would use the output from the inertial navigation algorithm 204, combined with a digital elevation map (DEM) for the earth to compute the location and velocity of the point where the payload line of sight intersects the earth's surface. In this context, the term "the earth's surface" includes not only a point on the actual surface of the earth but also a point at a specified height above the earth's surface; this point is often referred to as the "target". Thus, the control system 142 contains instructions for an inertial navigation system for computing the geographic position where a payload line of sight intersects the earth's surface.

In a typical implementation of the geographic steering algorithm 208, the control system 142 would accept gimbal control inputs from the gimbal control input source 190 for the geographic location and velocity of a desired target and compare this to the output of the inertial coordinates computation algorithm 206 to produce position and velocity error signals. The control system 142 may use a PID controller to calculate the demanded steering rates required to minimize the error, and the demanded steering rates may be transformed into the coordinate frame of the inertial measurement unit 110 either before or after the PID controller. Other types of controllers may also be used. The output of the geographic steering algorithm 208 is provided to the platform stabilization control algorithm 202 as the desired yaw, pitch, and roll line of sight (LOS) rates. Thus, the geographic steering algorithm 208 comprises instructions for closing geographic based steering control loops to maintain the payload line of sight pointing at a geographic position.

In a typical implementation of the power management algorithm 210, the control system 142 may accept inputs from voltage, current, and temperature sensors (not shown) throughout the system together with other data regarding the current state of the system. By using the past, present and predicted values for power consumption in the various subsystems the overall system power can be maintained within the specified limits while maximizing the overall system performance. For example, power for heaters or fans (not shown) could be temporarily reduced in order to provide more power to the active drive system 140 during instances of higher than normal demand. In this manner power can be managed between competing sub-systems thousands of times per second. The overall power limits for a system can be dynamic, allowing an external master controller to manage power across several systems, in real time, to maximize overall performance while maintaining overall power consumption within the power available.

In a typical implementation of the outer gimbal control algorithm 212, the control system 142 may accept angular position, rate, and inertial rate inputs from the sensors on the outer gimbal assembly 118, angular position data from the position sensor system 164 and desired rate data from (or calculated by the geographic steering algorithm 208 based on data from) the gimbal control input source 190. The control system 142 may use data from the position sensor system 164, resolved into the coordinate frame of the outer gimbal assembly 118, as an error signal in a PID controller to cause the outer gimbal assembly 118 to follow the line of sight. Additionally, the control system 142 may use the desired rates from the gimbal control input source 190 and/or the output of the geographic steering algorithm 208 as a feed-forward term. The control system 142 may also use data from the outer gimbal inertial rate sensors 192, 194, 196 as compared to the desired rates resolved into the coordinate frame of the outer gimbal assembly 118 to produce an error signal to be used in a PID type controller to compute demanded rates. The sum of the demanded rates from the position sensor system 164, feed-forward calculation, and outer gimbal inertial rate sensors 192, 194, 196 may be used as the final demand to the outer gimbal assembly actuators.

Development of a suitable platform stabilization control algorithm 202, inertial navigation algorithm 204, inertial coordinates computation algorithm 206, geographic steering algorithm 208, power management algorithm 210 and outer gimbal control algorithm 212 is within the capability of one skilled in the art, now informed by the present disclosure. For example, and without limitation, FIG. 8 of U.S. Pat. No. 6,263,160 to Lewis shows a platform stabilization loop, and FIGS. 7a and 7b of U.S. Pat. No. 5,897,223 to Tritchew et al. show a block diagram of inner and outer control loops for two- and three-axis outer gimbal systems. These patents are hereby incorporated by reference.

Figure 7:
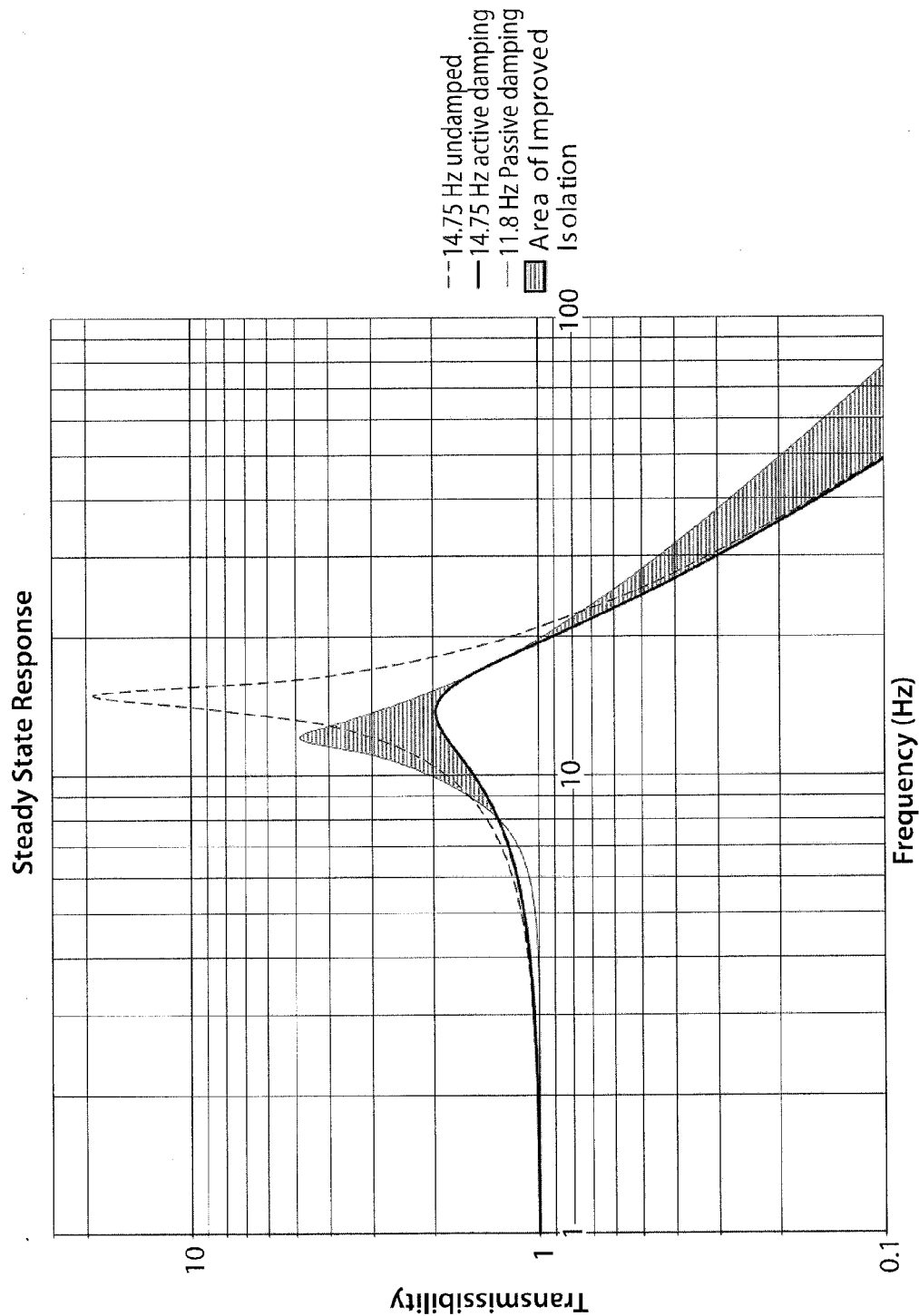
FIG. 7 is a graph comparing exemplary undamped and passively damped isolation systems with an exemplary actively damped isolation system as described herein.

The transfer functions of exemplary undamped, actively damped and passively damped (elastomeric) isolation systems are compared in FIG. 7. FIG. 7 shows the improved isolator performance provided by active damping used in the platform stabilization systems described herein. At frequencies well above the undamped natural frequency, the transmissibility for the actively damped system rolls off proportional to the square of the frequency ratio ($W_n/W$) while for the passive system it rolls off proportional to twice the damping ratio ($C/C_c$) multiplied by the frequency ratio ($W_n/W$). This means that higher damping can be applied to reduce the dynamic amplification or Q at resonance without the corresponding transmissibility penalty at higher frequencies. Also, because of this steeper roll-off, the undamped natural frequency can be pushed up enough to reduce the static displacement of the isolation system. The active isolator shown in FIG. 1, and whose performance is charted in the graph in FIG. 7, only requires +/−3/16" travel in the platform axes $X_P$, $Y_P$ and $Z_P$ for a range of +/−3 G to the stops while the typical passive elastomeric system requires +/−¼" travel for a range of only +/−2 G to the stops. This represents a significant reduction in sway space required with a corresponding increase in payload volume efficiency. This reduction in sway space also reduces the required size and weight of the isolators and the voice coil actuators, increasing payload volume efficiency.

In the exemplary platform stabilization system 100, the active drive system 140 comprises an array of four magnetic voice coil actuators 144. In other embodiments, an active drive system for a platform stabilization system may include more or fewer magnetic voice coil actuators.

Figure 5B:
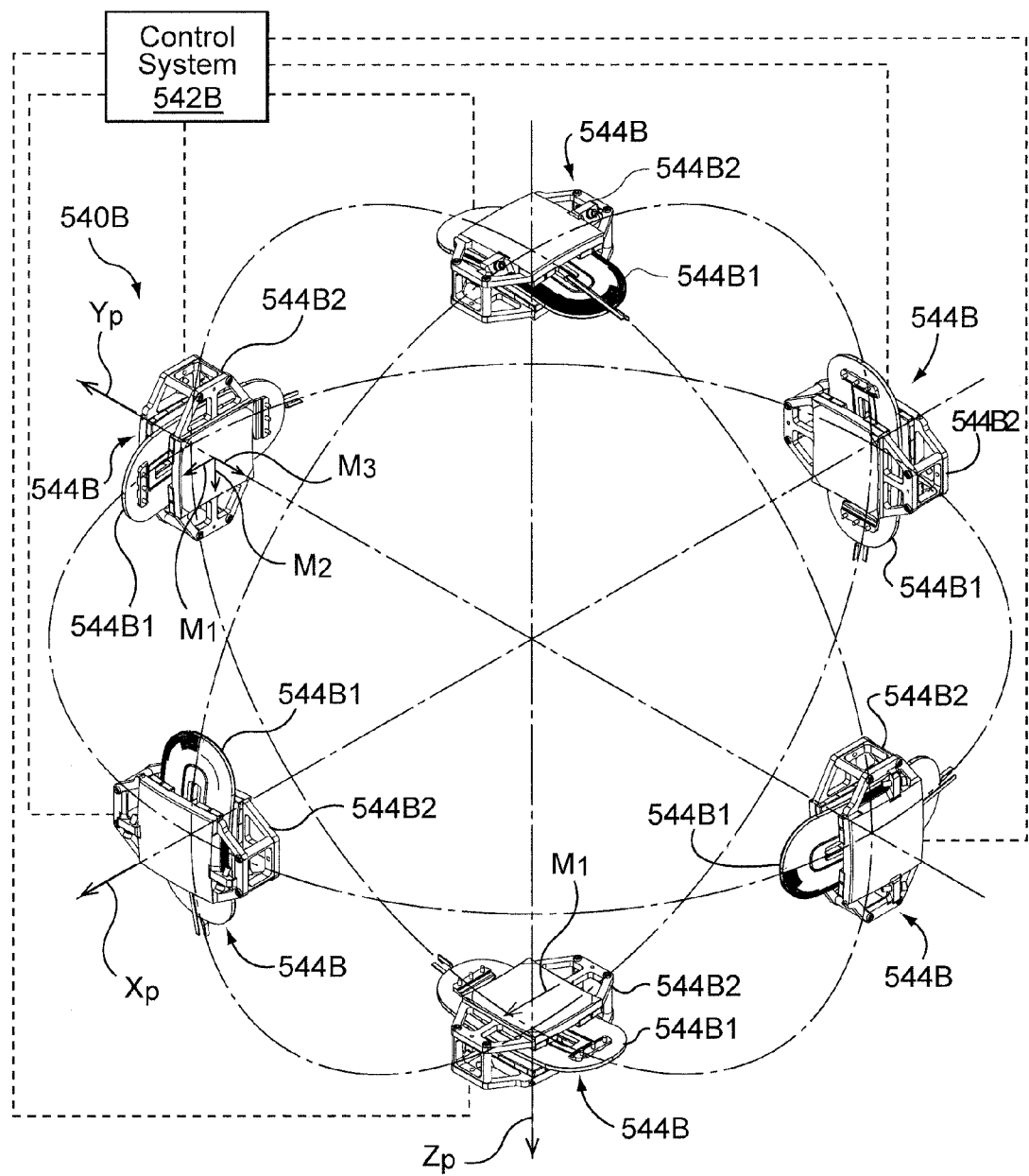
FIG. 5b shows the relative positions and orientations of the voice coil actuators in an exemplary active drive system comprising six single-axis voice coil actuators.

FIG. 5b shows the arrangement of an exemplary active drive system 540B comprising an array of six single-axis magnetic voice coil actuators 544B each comprising a first portion 544B2, in this case the magnetic structure portion, carried by the support frame and a second portion 544B1, in this case the coil portion, carried by the platform. Each magnetic voice coil actuator 544B has a single active motor axis $M_2$ along which a platform positioning force can be applied and two inactive motor axes $M_1$ and $M_3$ for which there is freedom of movement, with the three axes $M_1$, $M_2$ and $M_3$ being substantially orthogonal to one another. Thus, each magnetic voice coil actuator 544B acts between the support frame and the platform to apply a first platform positioning force to the platform along a first motor axis $M_2$ while permitting free linear movement of the second portion along each of a second motor axis $M_1$ and a third motor axis $M_3$ and permitting free rotation of the second portion 544B1 about each of the second motor axis $M_1$ and the third motor axis $M_3$. As can be seen in FIG. 5b, the magnetic voice coil actuators 544B are arranged relative to the platform (not shown in FIG. 5b) for selectively driving linear movement of the platform relative to the support frame (not shown in FIG. 5b) along the orthogonal platform axes $X_P$, $Y_P$ and $Z_P$ and for selectively driving rotation of the platform relative to the support frame about the platform axes $X_P$, $Y_P$ and $Z_P$. More particularly, when a current is passed through the coil 544B1 it creates an electromotive force along motor axis $M_2$ for that magnetic voice coil actuator 544B. When the polarity of two opposed magnetic voice coil actuators 544B is the same, those magnetic voice coil actuators 544B will produce a linear force parallel to the motor axes $M_2$ and when two opposed magnetic voice coil actuators 544B have the opposite polarity, those magnetic voice coil actuators 544B will produce a moment about an axis perpendicular to the motor axes $M_2$. Thus, through selective energization, the desired linear movement along and rotational movement about the platform axes $X_P$, $Y_P$ and $Z_P$ can be obtained. The control system, shown schematically at 542B in FIG. 5b, controls energization of the magnetic voice coil actuators 544B to apply the controlled moments and linear forces to the platform.

Figure 5C:
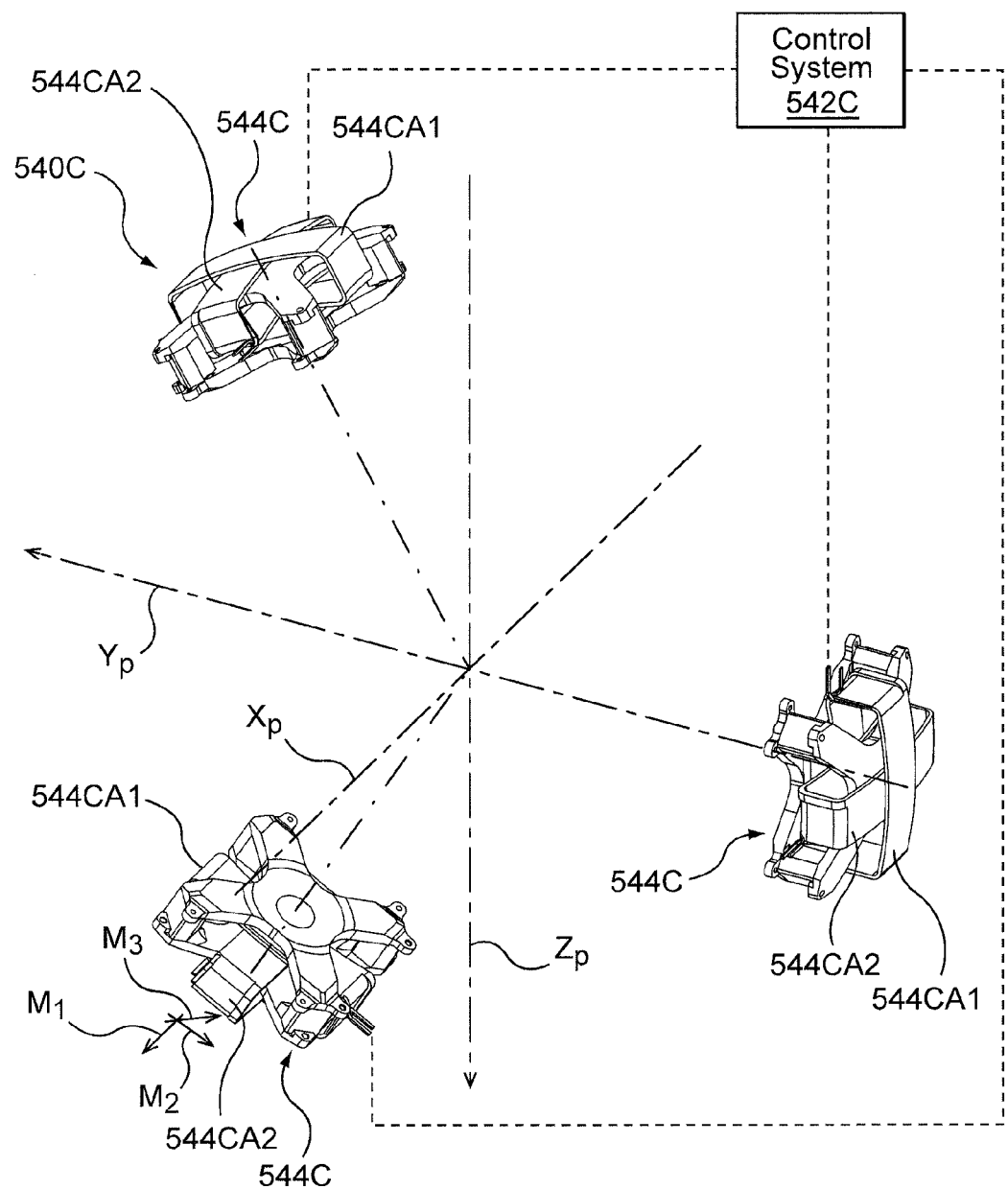
FIG. 5c shows the relative positions and orientations of the voice coil actuators in an exemplary active drive system comprising three two-axis voice coil actuators.

FIG. 5c shows the arrangement of an exemplary active drive system 540C comprising an array of three two-axis magnetic voice coil actuators 544C. Each magnetic voice coil actuator 544C acts between the support frame (not shown in FIG. 5c) and the platform (not shown in FIG. 5c) to apply a first platform positioning force to the platform along a first motor axis $M_1$ and apply a second platform positioning force to the platform along a second motor axis $M_2$ while permitting free linear movement of the platform along a third motor axis $M_3$ and permitting free rotation of the platform about the three motor axes $M_1$, $M_2$, $M_3$, which are substantially orthogonal to one another. The magnetic voice coil actuators 544C are arranged relative to the platform for selectively driving linear movement of the platform relative to the support frame along the platform axes $X_P$, $Y_P$ and $Z_P$ of the platform and for selectively driving rotation of the platform relative to the support frame about the platform axes $X_P$, $Y_P$ and $Z_P$. In particular, it can be seen in FIG. 5c that if the same coil 544CA1 on all of the magnetic voice coil actuators 544C were energized with the same polarity of current, the combined force vector would be along the platform axis $X_P$ (parallel to the motor axis $M_1$ of each magnetic voice coil actuator 544C). However, if the polarity of the current in the coil 544CA1 of the lower magnetic voice coil actuator 544C (lower left of FIG. 5c) were reversed and the current in the coil 544CA1 on the right side of FIG. 5c were zero, the combined forces would produce a moment about the platform axis $Y_P$. If the upper and lower magnetic voice coil actuators 544C (left side of FIG. 5c) were energized to produce a unit force along their motor axes $M_1$ and the third magnetic voice coil actuator 544C (right side of FIG. 5c) were to have the opposite polarity, and be energized to produce a force of two units, they would produce a moment about platform axis $Z_P$. Varying the magnitude and direction of the current in the coils 544CA1, 544CA2 allows control in six degrees of freedom. The control system 540C controls energization of the voice coil actuators to apply controlled moments and linear forces to the platform.

In the exemplary platform stabilization system 100 shown in FIGS. 1 to 3c, 5a, 6b and 8, the isolators have taken the form of compression springs 120. This is merely one exemplary type of isolator, and other types of isolators can also be used to build a platform stabilization system according to the teachings of the present disclosure.

Figure 4C:
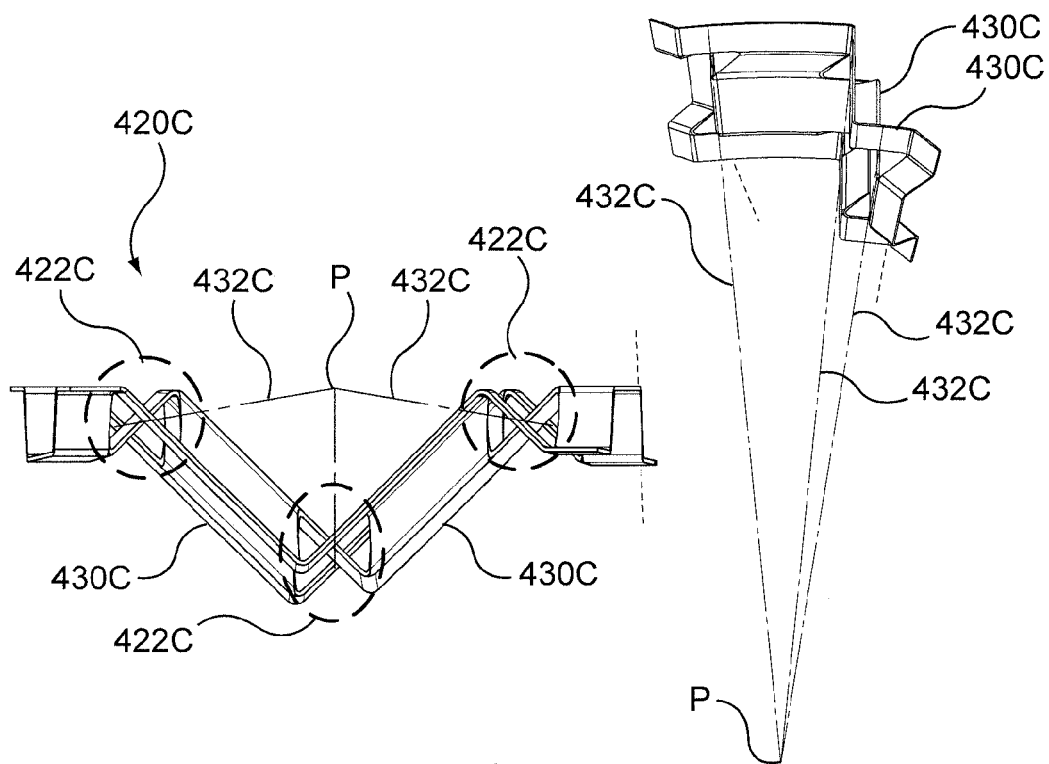
FIG. 4c shows two perspective views of an exemplary flexural pivot element isolator.
Figure 4D:
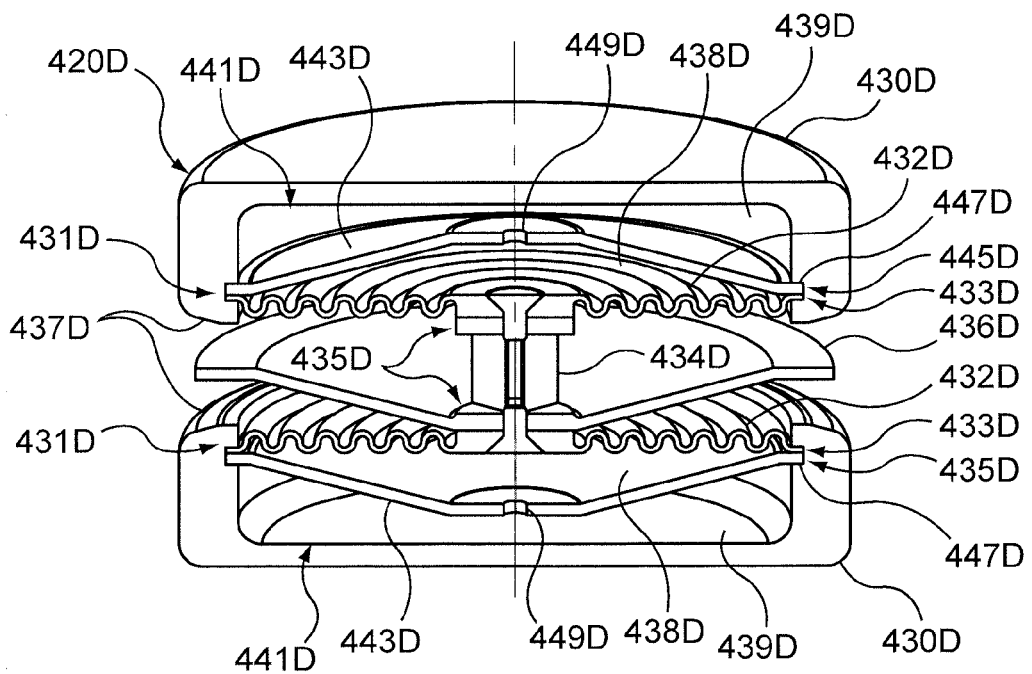
FIG. 4d is a cross-sectional view of a diaphragm-based isolator.

FIG. 4c shows exemplary isolators 420C which take the form of a three-axis flexural pivot elements 420C comprising three single-axis flexural pivots 422C arranged in series, with the flexural pivots 422C separated from one another by spacing members 430C. Each flexural pivot 422C has a respective pivot axis 432C, and these pivot axes 432C substantially intersect at a common point P within the platform (not shown in FIG. 4c). The flexural pivot elements 420C are preferably of monolithic construction, and the spacing members 430C may be designed to produce the desired ratio of linear to rotational stiffness when used in an isolation array, for example as shown in FIG. 4e.

Figure 4E:
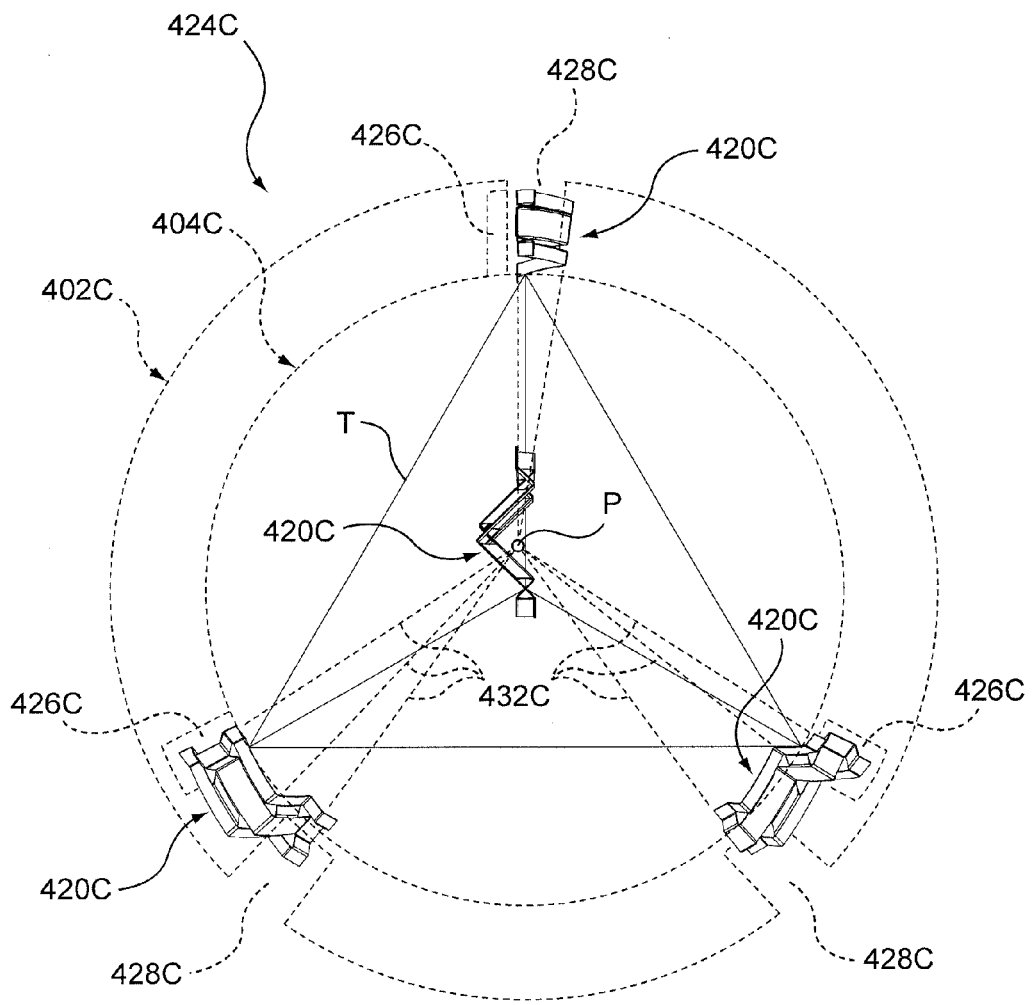
FIG. 4e is a schematic representation of an exemplary tetrahedral isolation array comprising a plurality of the flexural pivot element isolator of FIG. 4c.

FIG. 4e shows an exemplary symmetrical isolation array 424C comprising a plurality of three-axis flexural pivot element isolators 420C each extending directly between a support frame 402C and a platform 404C. Although the flexural pivots 422C that make up the isolators 420C are not symmetrical, the isolation array 424C is symmetrical.

The support frame 402C includes a plurality of mounting projections 428C and the platform 404C includes a plurality of outwardly extending fingers 426C, and each flexural pivot element isolator 420C extends between a respective finger 426C and mounting projection 428C. In the illustrated embodiment, the flexural pivot element isolators 420C are arranged at the vertices of a notional tetrahedron T; other embodiments may use other arrangements, such as having the flexural pivot element isolators 420C arranged at the vertices of a notional cube analogously to the arrangement shown in FIG. 4A. The three pivot axes 432C of each of the flexural pivot elements 420C substantially intersect at the same common point P within the platform 404C; thus in FIG. 4e there are four flexural pivot elements 420C each having three pivot axes 432C for a total of twelve pivot axes 432C, and all twelve pivot axes 432C substantially meet at the same common point P. The common point P is the centroid of mass of the platform 404C.

Each flexural pivot element isolator 420C permits linear movement of the platform 404C relative to the support frame 402C with three degrees of freedom and also permits rotational movement of the platform 404C relative to the support frame 402C with three degrees of freedom. The flexural pivot element isolators 420C cooperate to form an attitude-independent isolation array 424C supporting the platform 404C directly within the support frame 402C and spacing the platform 404C from the support frame 402C. As with the isolation array 124 using compression springs 120 as isolators, the isolation array 424C using flexural pivot element isolators 420C permits limited linear movement of the platform 404C relative to the support frame 402C with three degrees of freedom and permits limited rotational movement of the platform 404C relative to the support frame 402C with three degrees of freedom, and is substantially more resistant to linear movement of the platform 404C relative to the support frame 402C than to rotational movement of the platform 404C relative to the support frame 402C. Although the flexural pivots 422C may be considered to be rotational constraints, the platform 404C is not rotationally constrained by the exemplary flexural pivot element isolators 420C or by the exemplary isolation array 424C (see FIG. 4e) formed by the flexural pivot element isolators 420C.

FIG. 4d shows yet another exemplary configuration for an isolator, in this case a diaphragm-based isolator 420D. The exemplary diaphragm-based isolator 420D further comprises first and second hollow, open-ended generally cylindrical housings 430D, with each housing having a diaphragm receptacle 431D defined therein. The housings 430D are arranged so that the diaphragm receptacles 431D are opposed to one another. The diaphragm-based isolator 420D further comprises two opposed substantially identical generally circular diaphragms 432D, with each diaphragm 432D supported at its periphery 433D by one of the housings 430D and extending across the diaphragm receptacle 431D of that housing 430D. The diaphragms 432D are coupled to one another by a torsional flexure element 434D extending between radial centers 435D of the diaphragms 432D. Thus, the diaphragm-based isolator 420D is an example of multiple isolation elements coupled to one another to act in concert. When used in an isolation array, for example the isolation array 424D shown in FIG. 4f, one of the housings 430D is coupled to the support frame 402D and the other housing 430D is coupled to the platform 404D, such that for each isolator 420D, one of the diaphragms 432D is coupled to the support frame 402D and the other diaphragm 432D is coupled to the platform 404D. In the illustrated embodiment, the diaphragms 432D are metal structures in the form of concentrically ribbed bellophragms; in other embodiments a spoked structure, clock spring structure or molded elastomeric structure may be used. The torsional flexure element 434D is preferably axially resilient, and is long enough to cause the desired ratio of axial to lateral stiffness. In some embodiments, the torsional flexure element 434D may comprise a helical spring. Although certain types of flexure elements may be considered to be a rotational constraint acting between the diaphragms, the platform 404D is not rotationally constrained by the exemplary diaphragm-based isolators 420D or by the exemplary isolation array 424D (see FIG. 4f) formed by the diaphragm-based isolators 420D.

In the illustrated embodiment, the torsional flexure element 434D carries a stop 436D to limit lateral travel of the diaphragm-based isolator 420D. The exemplary stop 436D shown in FIG. 4d takes the form of a disk, and during lateral motion the disk-shaped stop 436D will tip until it contacts the edges 437D of the housings 430D, thereby arresting further lateral travel of the diaphragm-based isolator 420D.

In the exemplary embodiment shown in FIG. 4d, each diaphragm 432D is fluid-impermeable, and each housing 430D cooperates with its respective diaphragm 432D to form a damping reservoir 438D. Each damping reservoir 438D is in fluid communication with a respective sink reservoir 439D for damping axial movement of the respective diaphragm 432D by displacing damping fluid from the respective damping reservoir 438D to the respective sink reservoir 439D. More particularly, in the illustrated embodiment each housing 430D cooperates with its respective diaphragm 432D to form an enclosure 441D. A flanged frusto-conical divider 443D extends across each enclosure 441D to divide the respective enclosure 441D into the damping reservoir 438D and the sink reservoir 439D. Each damping reservoir 438D is in fluid communication with the respective sink reservoir 439D through an orifice 449D in the center of the respective divider 443D. The damping reservoirs 438D can be filled with a suitable fluid, such as oil, which will be forced through the orifice 449D in the center of the respective divider 443D into the sink reservoir 439D by axial movement at the center of the diaphragm 432D so as to produce a damping force that is proportional to the velocity of the axial movement only. Because the volume change in the cavity would be very small during lateral movement, the lateral damping in the element for lateral motion would be minimal. The flange 445D of each divider 443D and the periphery 433D of each diaphragm 432D are received in a respective annular recess 447D on the inside surface of the respective housing 420D.

Although the exemplary diaphragm-based isolators 420D provide passive damping by displacing fluid through the orifice 449D they may be modified to provide active damping by using an actuator to control the area of the orifice or by controlling the viscosity of the fluid in the region of the orifice by using an electrical coil at the orifice and using a suitable ferrofluid as the damping fluid.

Figure 3D:
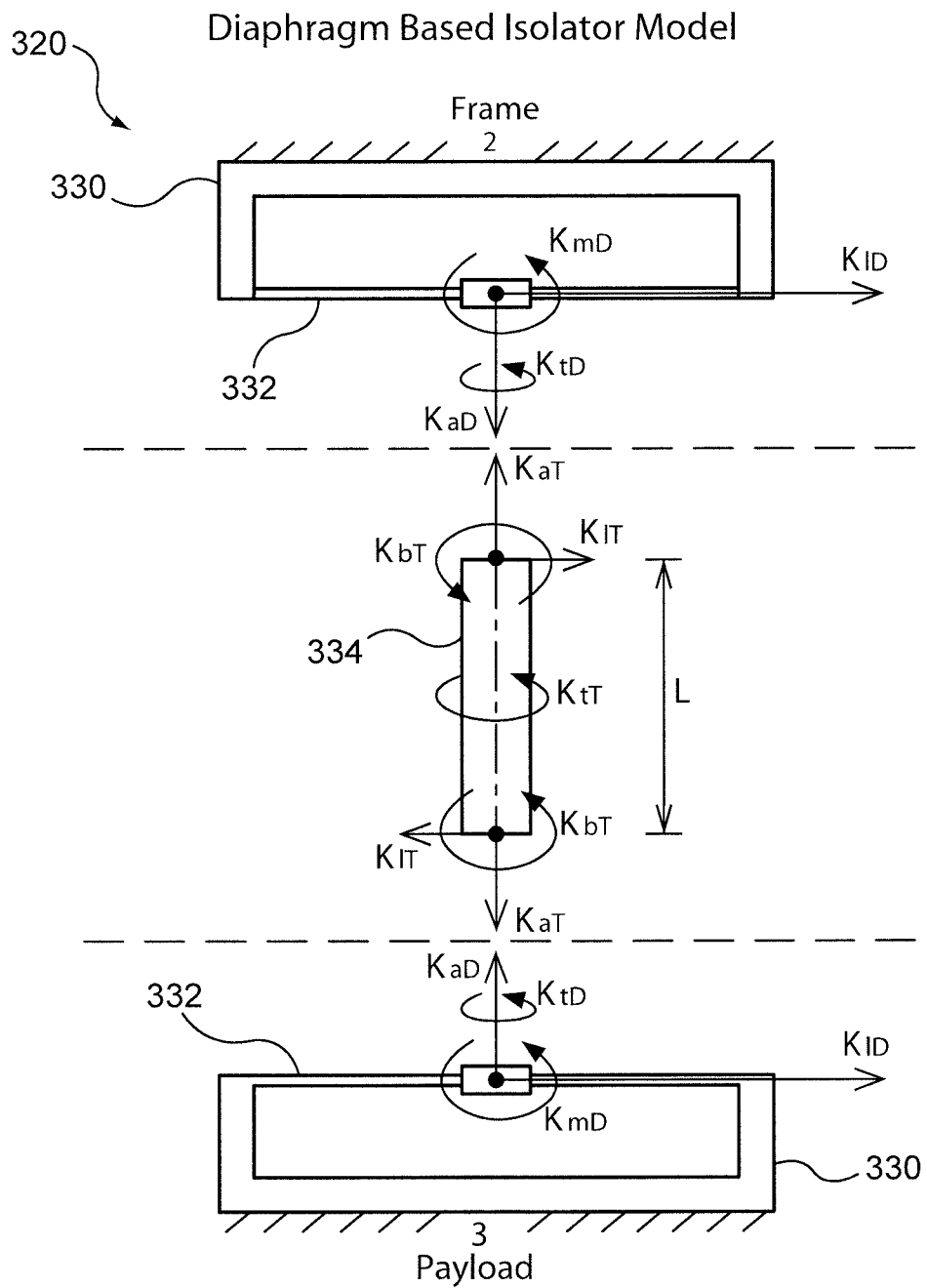
FIG. 3d shows a simplified mathematical model for a diaphragm-based isolator.

FIG. 3d shows a simplified mathematical model 320 for a diaphragm-based isolator such as the exemplary isolator 420D. The mathematical model is formed from two opposed open-ended housings 330 each having a diaphragm 332 extending across the open end, with the diaphragms being joined at their centers by a torsional flexure element 334. In the simplified mathematical model 320 for a diaphragm-based isolator:

$K_{aD}$ is the axial spring rate of the diaphragm;
$K_{lD}$ is the lateral spring rate of the diaphragm;
$K_{mD}$ is the moment spring rate of the diaphragm;
$K_{tD}$ is the torsional spring rate of the diaphragm;
$K_{aT}$ is the axial spring rate of the torsional flexure element;
$K_{lT}$ is the axial spring rate of the torsional flexure element;
$K_{bT}$ is the bending spring rate of the torsional flexure element;
$K_{tT}$ is the torsional spring rate of the torsional flexure element; and
L is the length of the torsional flexure element.

In the simplified mathematical model 320 in FIG. 3d:
Lateral stiffness is dominated by $2 K_{mD} L$;
Torsional stiffness is dominated by $K_{tT}$; and $$\text{Axial stiffness } K_a = 1/((2/K_{aD}) + (1/K_{aT})).$$

Figure 4F:
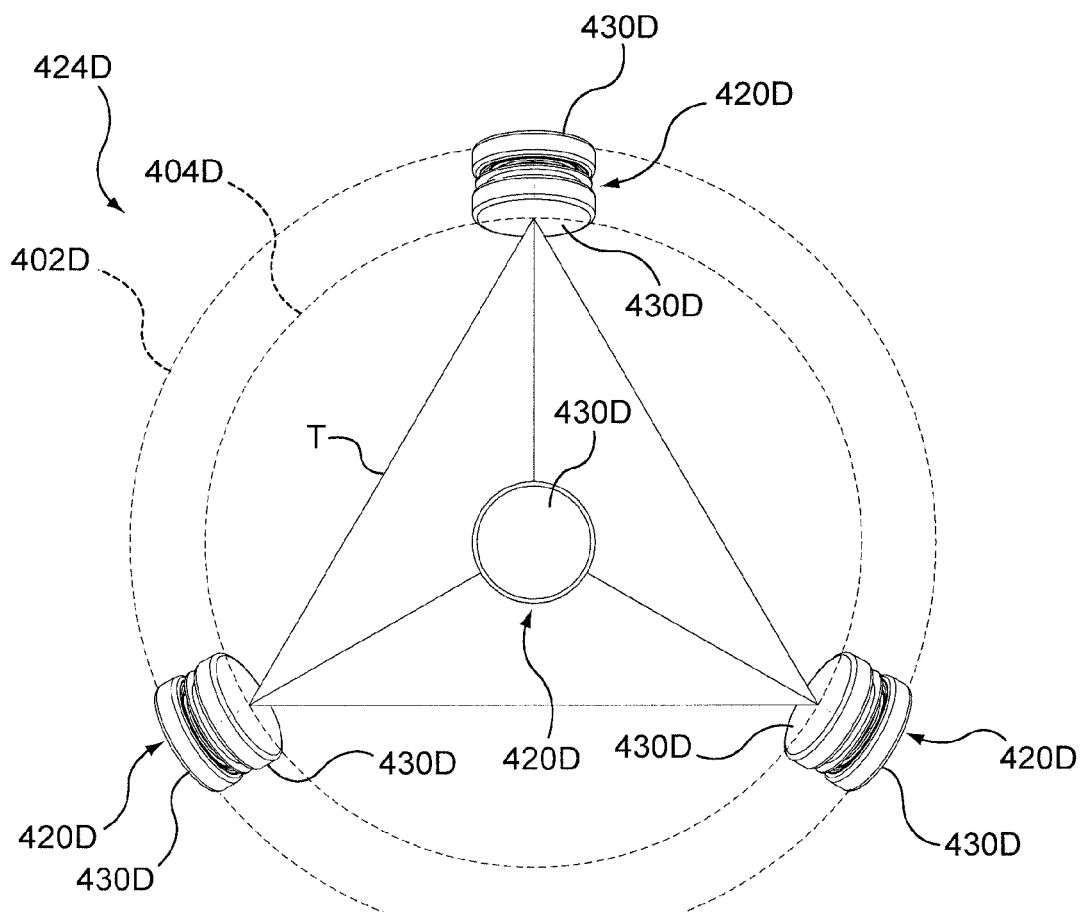
FIG. 4f is a schematic representation of an exemplary tetrahedral isolation array comprising a plurality of the diaphragm-based isolators of FIG. 4d.
Figure 4G:
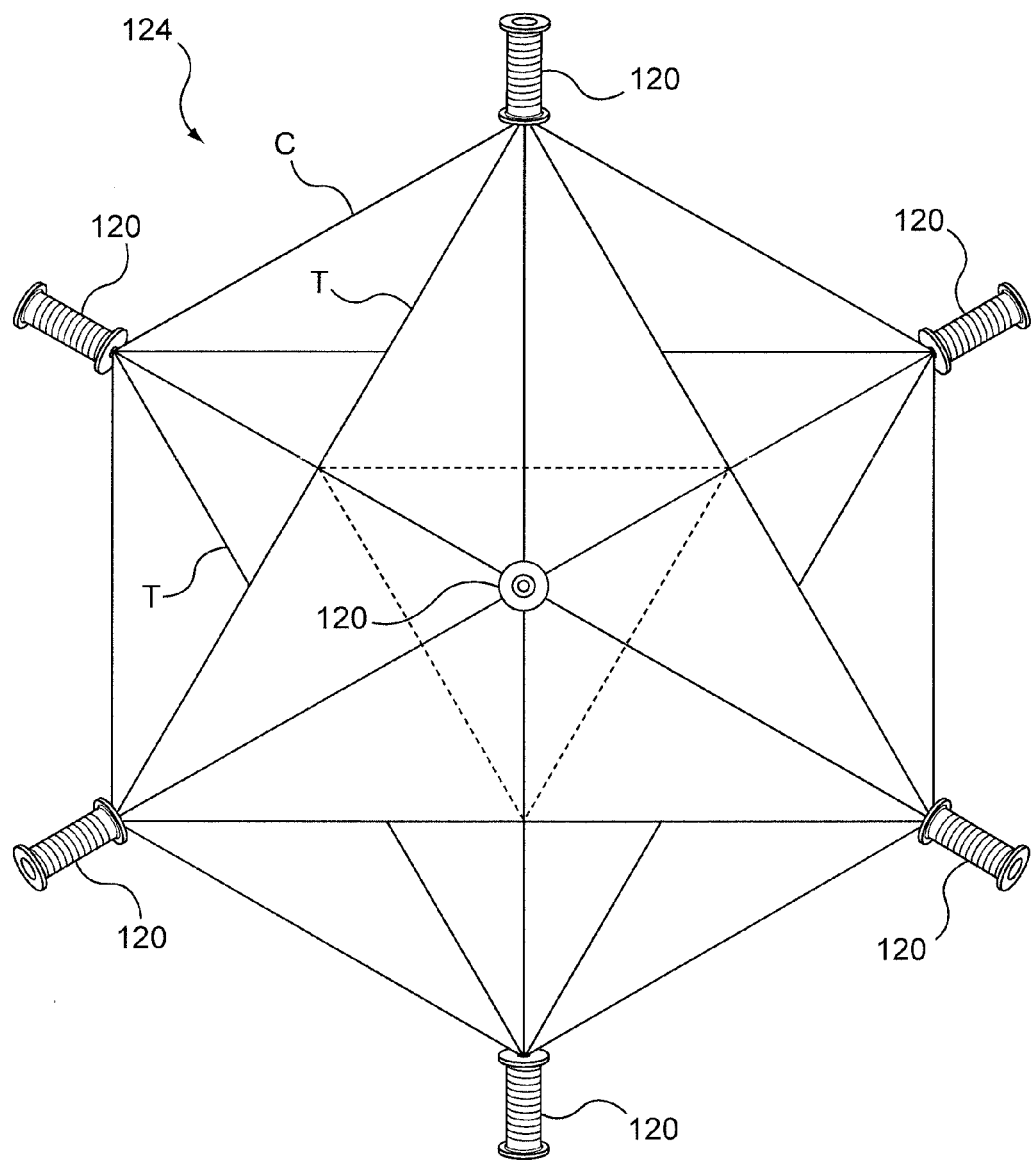
FIG. 4g is a schematic representation showing how the cubic isolation array shown in FIG. 4a can be considered as being made up of two equally sized tetrahedral isolation arrays in FIG. 4b, superimposed on one another with one of the tetrahedral isolation arrays rotated 180 degrees relative to the other.
Figure 4H:
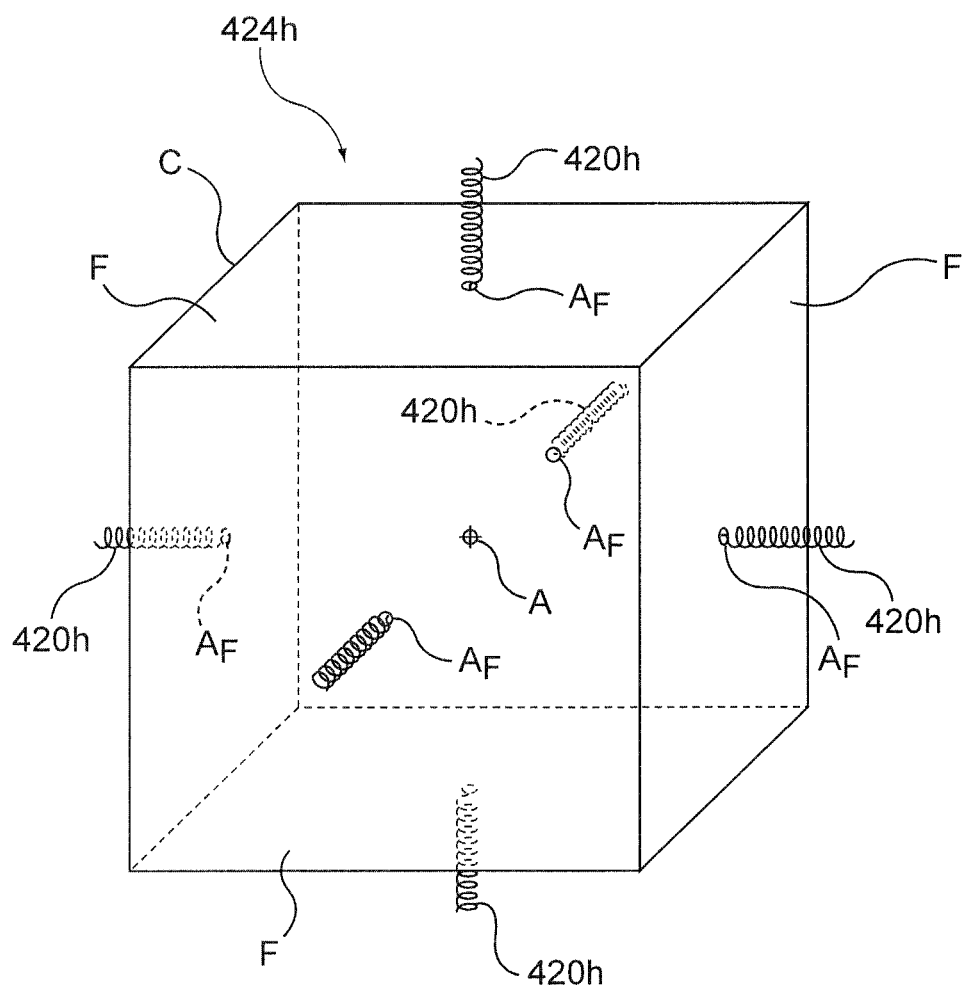
FIG. 4h is a schematic representation of a second cubic isolation array.

Reference is now made to FIG. 4f, which shows an exemplary isolation array 424D comprising a plurality of diaphragm-based isolators 420D each extending directly between a support frame 402D and a platform 404D. Similarly to the embodiment shown in FIG. 4e employing flexural pivot element isolators 420C, in the embodiment shown in FIG. 4f, the diaphragm-based isolators 420D are arranged at the vertices of a notional tetrahedron T so as to radiate outward from the centroid of mass of the platform 404D; other embodiments may use other arrangements. For example, the diaphragm-based isolators 420D may be arranged at the vertices of a notional cube analogously to the arrangement shown in FIG. 4A.

Each of the diaphragm-based isolators 420D permits linear movement of the platform 404D relative to the support frame 402D with three degrees of freedom and also permits rotational movement of the platform 404D relative to the support frame 402D with three degrees of freedom. The diaphragm-based isolators 420D therefore cooperate to form an attitude-independent isolation array 424D supporting the platform 404D directly within the support frame 402D while spacing the platform 404D from the support frame 402C. The isolation array 424D permits limited linear movement of the platform 404D relative to the support frame 402D with three degrees of freedom and permits limited rotational movement of the platform 404D relative to the support frame 402D with three degrees of freedom. The construction and positioning of the diaphragm-based isolators 420D makes the isolation array 424D substantially more resistant to linear movement of the platform 404D relative to the support frame 402D than to rotational movement of the platform 404D relative to the support frame 402D.

An isolation array comprising flexural pivot element isolators, such as the isolation array 424C in FIG. 4c, or an isolation array comprising diaphragm-based isolators, such as the isolation array 424D in FIG. 4d, may be combined with an active drive system and control system, such as the active drive systems 140, 540B, 540C shown in FIGS. 5a, 5b and 5c, respectively and the control system 142 shown in FIG. 8.

The exemplary systems described above are exemplary implementations of a method for isolating a payload from motion of a supporting structure. This method comprises permitting limited linear movement of the platform relative to the support frame with three degrees of freedom along three orthogonal platform axes and permitting limited rotational movement of the platform relative to the support frame with three degrees of freedom about the three platform axes while providing substantially greater resistance to linear movement of the platform relative to the support frame than to rotational movement of the platform relative to the support frame, without rotationally constraining the platform.

Aspects of the present technology have been described above with reference to a block diagram (FIG. 8) showing methods, apparatus (systems) and computer program products according to various embodiments. In this regard, the block diagram in FIG. 8 illustrates the architecture, functionality, and operation of possible implementations of systems, methods and computer program products according to various embodiments of the present technology. For instance, each block in the block diagram may represent a module, segment, or portion of code, which comprises one or more executable instructions for implementing the specified logical function(s). It will also be noted that each block of the block diagram, and combinations of blocks in the block diagram, can be implemented by special purpose hardware-based systems that perform the specified functions or acts, or combinations of special purpose hardware and computer instructions.

It also will be understood that each block of the block diagram, and combinations of blocks in the block diagram, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block diagram.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the block diagram block.

Figure 10:
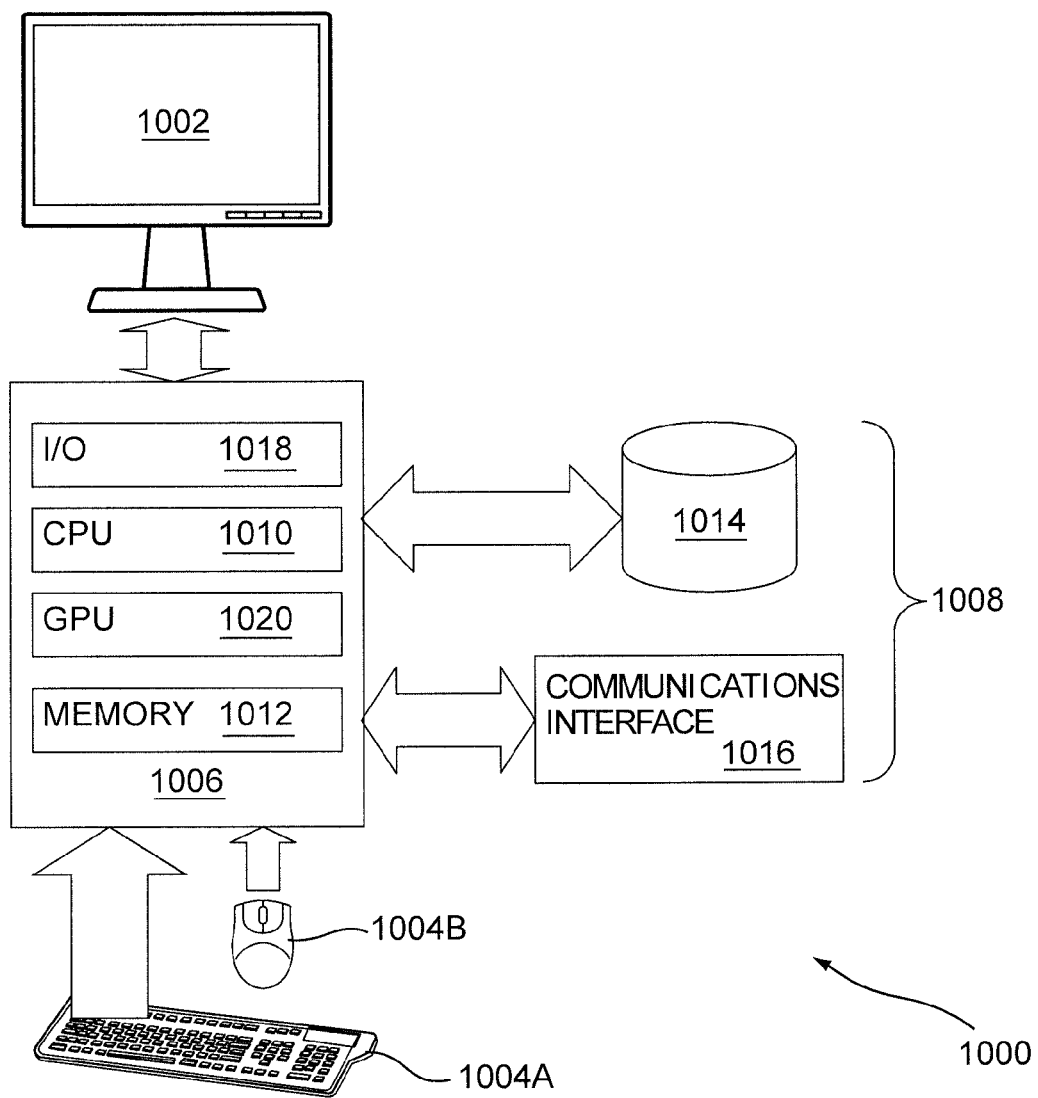
FIG. 10 is a block diagram showing an exemplary computer system which may be used in implementing aspects of the present technology.

An illustrative computer system in respect of which the methods herein described may be implemented is presented as a block diagram in FIG. 10. The illustrative computer system is denoted generally by reference numeral 1000 and includes a display 1002, input devices in the form of keyboard 1004A and pointing device 1004B, computer 1006 and external devices 1008. While pointing device 1004B is depicted as a mouse, it will be appreciated that other types of pointing device, or a touch-screen display, may also be used.

The computer 1006 may contain one or more processors or microprocessors, such as a central processing unit (CPU) 1010. The CPU 1010 performs arithmetic calculations and control functions to execute software stored in an internal memory 1012, preferably random access memory (RAM) and/or read only memory (ROM), and possibly additional memory 1014. The additional memory 1014 may include, for example, mass memory storage, hard disk drives, optical disk drives (including CD and DVD drives), magnetic disk drives, magnetic tape drives (including LTO, DLT, DAT and DCC), flash drives, program cartridges and cartridge interfaces such as those found in video game devices, removable memory chips such as EPROM or PROM, emerging storage media, such as holographic storage, or similar storage media as known in the art. This additional memory 1014 may be physically internal to the computer 1006, or external as shown in FIG. 10, or both.

The computer system 1000 may also include other similar means for allowing computer programs or other instructions to be loaded. Such means can include, for example, a communications interface 1016 which allows software and data to be transferred between the computer system 1000 and external systems and networks. Examples of communications interface 1016 can include a modem, a network interface such as an Ethernet card, a wireless communication interface, or a serial or parallel communications port. Software and data transferred via communications interface 1016 are in the form of signals which can be electronic, acoustic, electromagnetic, optical or other signals capable of being received by communications interface 1016. Multiple interfaces, of course, can be provided on a single computer system 1000.

Input and output to and from the computer 1006 is administered by the input/output (I/O) interface 1018. This I/O interface 1018 administers control of the display 1002, keyboard 1004A, external devices 1008 and other such components of the computer system 1000, as well as input from various sensors. The computer 1006 also includes a graphical processing unit (GPU) 1020. The latter may also be used for computational purposes as an adjunct to, or instead of, the (CPU) 1010, for mathematical calculations.

The various components of the computer system 1000 are coupled to one another either directly or by coupling to suitable buses. It will be appreciated that a computer system used for a control system for a platform stabilization system as described herein may omit some of the above-described components.

The term "computer system", as used herein, is not limited to any particular type of computer system and encompasses servers, desktop computers, laptop computers, networked mobile wireless telecommunication computing devices such as smartphones, tablet computers, as well as other types of computer systems.

As will be appreciated by one skilled in the art, aspects of the technology described herein may be embodied as a system, method or computer program product. Accordingly, aspects of the technology described herein may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the presently described technology may take the form of a computer program product embodied in one or more computer readable medium(s) carrying computer readable program code.

Where aspects of the technology described herein are implemented as a computer program product, any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. Thus, computer readable program code for implementing aspects of the technology described herein may be contained or stored in the memory 1012 of the computer 1006, or on a computer usable or computer readable medium external to the computer 1006, or on any combination thereof.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the presently described technology may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Finally, the terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description has been presented for purposes of illustration and description, but is not intended to be exhaustive or limited to the form disclosed. Many modifications and variations will be apparent to those of ordinary skill in the art without departing from the scope of the claims. The embodiments were chosen and described in order to best explain the principles of the technology and the practical application, and to enable others of ordinary skill in the art to understand the technology for various embodiments with various modifications as are suited to the particular use contemplated.

Several currently preferred embodiments have been described by way of example. It will be apparent to persons skilled in the art that a number of variations and modifications can be made without departing from the scope of the invention as defined in the claims.

What is claimed is:

1. A platform stabilization system for isolating a payload from motion of a supporting structure, the platform stabilization system comprising:
   a support frame;
   a platform for carrying a payload;
   a plurality of isolators each extending directly between the support frame and the platform absent any intervening gimbals, rings or other motion-constraining structures between the platform and the support frame;
   each isolator permitting linear movement of the platform relative to the support frame with three degrees of freedom;
   each isolator permitting rotational movement of the platform relative to the support frame with three degrees of freedom;
   the plurality of isolators cooperating to form an isolation array supporting the platform directly within the support frame;
   the isolation array spacing the platform from the support frame;
   the isolation array permitting limited linear movement of the platform relative to the support frame with three degrees of freedom along three orthogonal platform axes;
   the isolation array permitting limited rotational movement of the platform relative to the support frame with three degrees of freedom about the three platform axes;
   the isolation array being substantially more resistant to linear movement of the platform relative to the support frame than to rotational movement of the platform relative to the support frame; and wherein the platform is not rotationally constrained by the isolation array.

2. The platform stabilization system of claim 1, wherein the isolation array has an undamped natural frequency for linear movement of the platform along the platform axes that is at least two times an undamped natural frequency for rotational movement of the platform about the platform axes.

3. The platform stabilization system of claim 2, wherein the undamped natural frequency for linear movement of the platform along the platform axes is at least three times the undamped natural frequency for rotational movement of the platform about the platform axes.

4. The platform stabilization system of claim 3, wherein the undamped natural frequency for linear movement of the platform along the platform axes is at least five times the undamped natural frequency for rotational movement of the platform about the platform axes.

5. The platform stabilization system of claim 3, wherein the undamped natural frequency for linear movement of the platform along the platform axes is at least ten times the undamped natural frequency for rotational movement of the platform about the platform axes.

6. The platform stabilization system of claim 1, wherein:
each isolator comprises at least one compression spring having a respective spring axis; and
to form the isolation array:
the compression springs are arranged with their respective spring axes radiating outward substantially from a common point within the platform;
the common point being the centroid of mass of the platform; and
the compression springs are axially preloaded to produce a low lateral spring rate.

7. The platform stabilization system of claim 6, wherein the isolation array comprises eight compression springs arranged substantially at corners of a notional cube and the common point is a centroid of the notional cube.

8. The platform stabilization system of claim 6, wherein the isolation array comprises at least one array of four compression springs arranged substantially at corners of a notional regular tetrahedron and the common point is a centroid of the notional regular tetrahedron.

9. The platform stabilization system of claim 6, wherein the isolation array comprises six compression springs radiating outward from a centroid of a notional cube substantially through centroids of the six faces of the notional cube.

10. The platform stabilization system of claim 6, wherein the isolation array comprises a symmetrical array of compression springs.

11. The platform stabilization system of claim 6, wherein the compression springs are machined, multi-start, helical compression springs.

12. The platform stabilization system of claim 1, wherein each isolator comprises a flexural pivot element.

13. The platform stabilization system of claim 12, wherein:
each flexural pivot element comprises three single-axis flexural pivots arranged in series with each flexural pivot having a pivot axis;
for each flexural pivot element, the pivot axes of each flexural pivot substantially meet at a centroid of mass of the platform; and
the flexural pivot elements are arranged in a substantially symmetrical array to form the isolation array.

14. The platform stabilization system of claim 13, wherein each flexural pivot element is of monolithic construction.

15. The platform stabilization system of claim 1 wherein each isolator is a diaphragm-based isolator.

16. The platform stabilization system of claim 15, wherein each diaphragm-based isolator comprises:
a first housing carried by the support frame;
a second housing carried by the platform;
each housing having a diaphragm receptacle defined therein;
the diaphragm receptacles being opposed to one another;
two opposed diaphragms, each diaphragm being supported at its periphery by one of the housings and extending across the diaphragm receptacle of that housing so that for each isolator, one of the diaphragms is coupled to the support frame and the other of the opposed diaphragms is coupled to the platform; and
the diaphragms are coupled to one another by a torsional flexure element extending between radial centers of the diaphragms.

17. The platform stabilization system of claim 16, wherein the torsional flexure element is axially resilient.

18. The platform stabilization system of claim 16, wherein the torsional flexure element is a helical spring.

19. The platform stabilization system of claim 16 wherein the diaphragms are molded elastomeric structures.

20. The platform stabilization system of claim 16 wherein the diaphragms are metal bellophragm structures.

21. The platform stabilization system of claim 16, wherein each diaphragm-based isolator further comprises a stop carried by the torsional flexure element to limit lateral travel of the torsional flexure element.

22. The platform stabilization system of claim 16, wherein:
each diaphragm is fluid-impermeable;
each housing cooperates with its respective diaphragm to form a damping reservoir; and
each damping reservoir is in fluid communication with a respective sink reservoir for damping axial movement of the respective diaphragm by displacing damping fluid from the respective damping reservoir to the respective sink reservoir.

23. The platform stabilization system of claim 22, wherein:
each housing cooperates with its respective diaphragm to form an enclosure;
a divider extends across each enclosure to divide the respective enclosure into the damping reservoir and the sink reservoir; and
each damping reservoir is in fluid communication with the respective sink reservoir through at least one orifice in the respective divider.

24. The platform stabilization system of claim 1, further comprising:
an active drive system acting directly between the support frame and the platform; and
a control system coupled to the active drive system for receiving sensor input and controlling the active drive system in response to the sensor input.

25. The platform stabilization system of claim 24, wherein the control system uses the sensor input to control the active drive system for stable motion of the platform.

26. The platform stabilization system of claim 24, wherein the control system uses the sensor input to control the active drive system for active damping of the platform.

27. The platform stabilization system of claim 24, wherein the active drive system comprises an array of at least three magnetic voice coil actuators, wherein:
each magnetic voice coil actuator comprises a first portion carried by the support frame and a second portion carried by the platform;

each magnetic voice coil actuator acts directly between the support frame and the platform to apply a first platform positioning force to the platform along a first motor axis and apply a second platform positioning force to the platform along a second motor axis while permitting free linear movement of the platform along a third motor axis and permitting free rotation of the platform about the three motor axes, with the first, second and third motor axes being substantially orthogonal to one another;

the magnetic voice coil actuators arranged relative to the platform for selectively driving linear movement of the platform relative to the support frame along the platform axes and for selectively driving rotation of the platform relative to the support frame about the platform axes; and the control system controls energization of the voice coil actuators to apply controlled moments and linear forces to the platform.

28. The platform stabilization system of claim 27, wherein the at least three magnetic voice coil actuators are four magnetic voice coil actuators arranged approximately 90 degrees apart on a circumference of a notional circle.

29. The platform stabilization system of claim 24, wherein the active drive system comprises an array of at least six magnetic voice coil actuators, wherein:

each magnetic voice coil actuator comprises a first portion carried by the support frame and a second portion carried by the platform;

each magnetic voice coil actuator acts directly between the support frame and the platform to apply a first platform positioning force to the platform along a first motor axis while permitting free linear movement of the second portion along each of a second motor axis and a third motor axis and permitting free rotation of the second portion about each of the second motor axis and the third motor axis, with the first, second and third axes being substantially orthogonal to one another;

the magnetic voice coil actuators arranged relative to the platform for selectively driving linear movement of the platform relative to the support frame along the platform axes and for selectively driving rotation of the platform relative to the support frame about the platform axes; and the control system controls energization of the voice coil actuators to apply controlled moments and linear forces to the platform.

30. The platform stabilization system of claim 24, further comprising an angle sensor system for sensing and providing a signal indicative of an angular position of the platform relative to the support frame about the platform axes, the angle sensor system being coupled to the control system.

31. The platform stabilization system of claim 24, further comprising a linear position sensor system for sensing and providing a signal indicative of a linear position of the platform relative to the support frame on the platform axes, the linear position sensor system being coupled to the control system.

32. The platform stabilization system of claim 24, wherein the platform carries at least three inertial rate sensors for sensing and providing a signal indicative of angular movement of the platform about the platform axes, the inertial rate sensors being coupled to the control system.

33. The platform stabilization system of claim 32, wherein the inertial rate sensors are fibre-optic gyros.

34. The platform stabilization system of claim 24, wherein the platform carries at least three inertial acceleration sensors for sensing and providing a signal indicative of linear movement of the platform along the platform axes, the inertial acceleration sensors being coupled to the control system.

35. The platform stabilization system of claim 24, further comprising an inertial measurement unit for sensing and providing signals indicative of linear and angular movement of the platform about the platform axes, the inertial measurement unit being coupled to the control system.

36. The platform stabilization system of claim 24, further comprising a GPS receiver coupled to the control system;

the control system containing instructions for an inertial navigation system for computing the geographic position where a platform line of sight intersects the earth's surface.

37. The platform stabilization system of claim 36, wherein the control system contains instructions for closing geographic based steering control loops to maintain the platform line of sight pointing at a geographic position.

38. The platform stabilization system of claim 37, wherein the control system contains instructions for computing parameters to step and stare a payload line of sight of a payload carried by the platform, within its limited range of motion, to limit, during an image integration period of the payload, relative rotational motion of the payload line of sight with respect to the earth caused by rotational motion of an orbiting aircraft carrying the platform stabilization system.

39. A platform stabilization system according to claim 1 wherein the support frame is carried by an outer gimbal assembly.

40. A method for isolating a payload from motion of a supporting structure, the method comprising:

permitting limited linear movement of the platform relative to a support frame with three degrees of freedom along three orthogonal platform axes;

permitting limited rotational movement of the platform relative to the support frame with three degrees of freedom about the three platform axes; and providing substantially greater resistance to linear movement of the platform relative to the support frame than to rotational movement of the platform relative to the support frame without rotationally constraining the platform;

wherein a plurality of isolators each extend directly between the support frame and the platform absent any intervening gimbals, rings or other motion-constraining structures between the platform and the support frame.

* * * * *